United States Patent [19]

Matsuda

[11] Patent Number: 4,957,329
[45] Date of Patent: Sep. 18, 1990

[54] MALFUNCTION PREVENTIVE ANTI-SKID BRAKE CONTROL SYSTEM FOR AUTOMOTIVE BRAKE SYSTEM

[75] Inventor: Toshiro Matsuda, Sagamihara, Japan

[73] Assignee: Nissan Motor Company, Limited, Yokohama, Japan

[21] Appl. No.: 244,655

[22] Filed: Sep. 14, 1988

Related U.S. Application Data

[63] Continuation of Ser. No. 886,759, Jul. 15, 1986, abandoned, which is a continuation of Ser. No. 673,200, Nov. 19, 1984, abandoned.

[30] Foreign Application Priority Data

Nov. 25, 1983 [JP] Japan .................. 58-220542

[51] Int. Cl.$^5$ ............................... B60T 8/02
[52] U.S. Cl. .................... 303/97; 303/109; 303/106
[58] Field of Search ............ 303/96, 97, 106, 105, 303/109, 110, 111, 119; 188/181 A, 181 O; 346/426, 426.01, 426.02, 426.03

[56] References Cited

U.S. PATENT DOCUMENTS

| | | |
|---|---|---|
| 2,914,359 | 11/1959 | Yarber . |
| 3,398,995 | 8/1968 | Martin . |
| 3,503,653 | 3/1970 | Davis et al. . |
| 3,637,264 | 1/1972 | Leiber et al. . |
| 3,744,855 | 7/1973 | Ochiai ............... 303/109 |
| 3,752,536 | 8/1973 | Machek . |
| 3,930,688 | 1/1976 | Rau et al. . |
| 3,938,612 | 2/1976 | Boudeville et al. . |
| 3,943,345 | 3/1976 | Ando et al. . |
| 3,985,396 | 10/1976 | Kuwana et al. . |
| 3,989,063 | 11/1976 | Brouwers ............. 303/119 |
| 4,239,295 | 12/1980 | Rode ................. 303/106 |
| 4,266,833 | 5/1981 | Sato et al. ............ 303/106 |
| 4,267,575 | 5/1981 | Bounds . |
| 4,315,213 | 2/1982 | Wolff . |
| 4,384,330 | 5/1983 | Matsuda et al. ........ 303/109 |
| 4,392,202 | 7/1983 | Matsuda et al. ........ 303/109 |
| 4,395,761 | 7/1983 | Sato et al. ............ 364/426 |
| 4,408,290 | 10/1983 | Kubo et al. . |
| 4,430,714 | 2/1984 | Matsuda et al. ........ 303/105 |
| 4,569,560 | 2/1986 | Kubo . |

FOREIGN PATENT DOCUMENTS

| | | |
|---|---|---|
| A-0-050279 | 10/1981 | European Pat. Off. . |
| A-2508834 | 2/1975 | Fed. Rep. of Germany . |
| A-3103967 | 2/1981 | Fed. Rep. of Germany . |
| A-3132663 | 8/1981 | Fed. Rep. of Germany . |
| 89096 | 8/1976 | Japan . |
| 28900 | 7/1980 | Japan . |
| 100363 | 8/1981 | Japan . |
| A-21098882 | 7/1981 | United Kingdom . |

*Primary Examiner*—Alvin Oberley
*Attorney, Agent, or Firm*—Foley & Lardner, Schwartz, Jeffery, Schwaab, Mack, Blumenthal & Evans

[57] ABSTRACT

An anti-skid brake control system detects wheel acceleration greater than a predetermined value. The predetermined value is set greater than an acceleration threshold which is used for switching operational mode from braking pressure decreasing mode (RELEASE mode) to decreased pressure hold mode (HOLD mode). When the wheel acceleration greater than the predetermined value is detected, the control system provide a delay time for projecting an estimated vehicle speed which is derived on the basis of wheel speed at which a predetermined wheel deceleration is obtained, which estimated vehicle speed is used for deriving a target wheel speed and defines a switching criteria for switching operational mode from braking pressure holding mode for holding brake pressure at decreased level to braking pressure application mode (APPLICATION mode) to increase the braking pressure. The delay time satisfactorily prevent the control system from projecting the estimated vehicle speed at a speed higher than an actual vehicle speed.

15 Claims, 19 Drawing Sheets

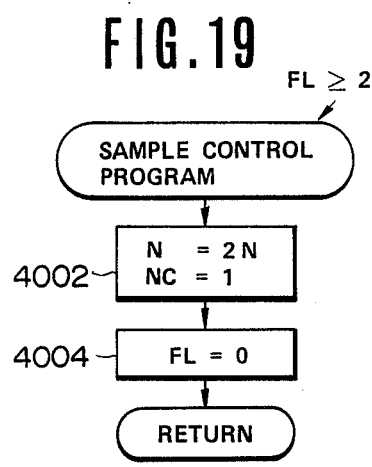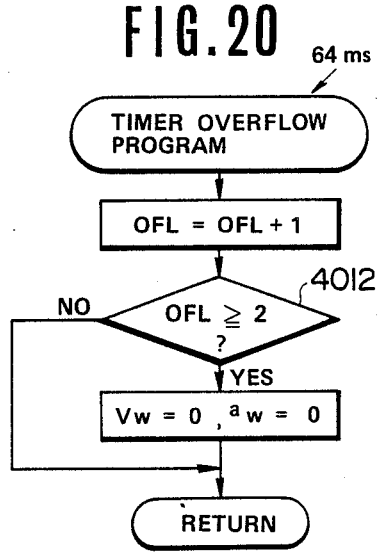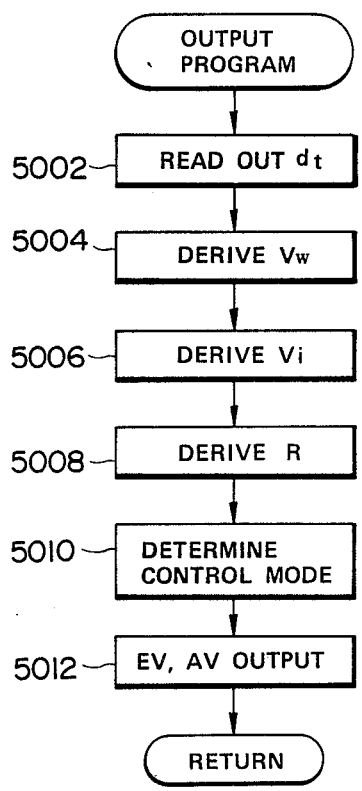

MALFUNCTION PREVENTIVE ANTI-SKID BRAKE CONTROL SYSTEM FOR AUTOMOTIVE BRAKE SYSTEM

This application is a continuation of application Ser. No. 886,759, filed July 15, 1986, now abandoned, which is a continuation of application Ser. No. 673,200, filed Nov. 19, 1984, now abandoned.

BACKGROUND OF THE INVENTION

The present invention relates generally to an anti-skid brake control system for optimizing braking characteristics in an automotive brake system and preventing vehicle wheels from skidding. More particularly, the invention relates to a technique for avoiding malfunction in anti-skid control, which may possibly occur in various situation on which the vehicle is situated, especially while passing through a road having relatively high friction on the road surface.

In such anti-skid control system, anti-skid control is generally performed when the wheel is decelerated at a deceleration rate greater than a predetermined deceleration threshold. In the usual state, wheel deceleration greater than the deceleration threshold appears only when the vehicle is decelerated by application of the vehicular brake. However, in certain situations, it is possible to detect wheel deceleration greater than the deceleration threshold even when the brake is not applied. For example, when the road surface has a relatively high friction rate to provide good road tire traction, wheel speed may overrun beyond the wheel speed corresponding to the vehicle speed. In such situation, a relatively high rate of deceleration subsequent to overrunning appears to return the wheel speed to the speed corresponding to the vehicle speed. Such deceleration rate sometimes exceeds the deceleration threshold. This may occur when braking pressure in the vehicle brake system is decreased by the function of the anti-skid control system. As is per se well known, when wheel deceleration greater than the deceleration threshold is detected, the anti-skid control system become active to hold braking pressure constant until the wheel acceleration is increased across the deceleration threshold or the wheel slippage reaches a given slippage threshold set nearby the skidding criteria.

Therefore, when the anti-skid control system erroneously enters into operation in response to the wheel deceleration greater than the deceleration threshold appearing subsequent to overrunning of the wheel, the brake pressure is held constant decreased or at a completely released level to cause "no-braking state" while the brake is applied. This necessarily prolongates the braking distance and subjects the vehicle to serious danger.

In another possible situation, wheel deceleration greater than the deceleration threshold may be detected when "wheel-spinning" during abrupt acceleration of the vehicle. For instance, when wheelspinning during abrupt deceleration occurs, wheel speed is extraordinarily increased beyond the speed corresponding to the vehicle speed. When wheel-spinning terminates, the wheel speed is decreased to the speed corresponding to the vehicle speed. At this situation wheel deceleration is necessarily greater than the deceleration threshold. The anti-skid brake control system thus become active to feed a control signal to hold or decrease the brake pressure. This control signal may possibly be maintained to keep the brake system at the hold or release mode to disable increasing of braking pressure.

SUMMARY OF THE INVENTION

Therefore, it is an object of the invention to provide and anti-skid brake control system which avoids the malfunction set forth above.

Another and more specific object of the present invention is to provide an anti-skid brake control system which is detective of the acceleration state of the wheel beyond a speed corresponding to the vehicle speed to temporarily disable the anti-skid control operation of the anti-skid control system.

In order to accomplish the above-mentioned and other objects, an anti-skid brake control system in accordance with the present invention, detects wheel acceleration greater than a predetermined value. The predetermined value is set greater than an acceleration threshold which is used for switching operational mode from a braking pressure decreasing mode (RELEASE mode), to decreased pressure in a hold mode (HOLD mode). When the wheel acceleration greater than the predetermined value is detected, the control system provide a delay time for projecting an estimated vehicle speed which is derived on the basis of wheel speed at which a predetermined wheel deceleration is obtained, which estimated vehicle speed is sued for deriving a target wheel speed and defines a switching the criteria for switching operational mode from a braking pressure holding mode for holding brake pressure at a decreased level to a braking pressure application mode (APPLICATION mode) to increase the braking pressure. The delay time satisfactorily prevent the control system from projecting the estimated vehicle speed at a speed higher than an actual vehicle speed.

In accordance with one aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure in the wheel cylinder in its first position, to hold the braking pressure at an increase level at its second position, to decrease the braking pressure at its third position and to hold the braking pressure at decreased level at its fourth position, a wheel speed sensor detecting rotation speed of the wheel and producing a wheel speed indicative signal having a value indicative of the detected wheel speed, a controller deriving a wheel acceleration and other brake control parameters on the basis of the wheel speed indicative signal value, the controller projecting a projected speed corresponding to a vehicle speed on the basis of a wheel speed indicative signal value at a timing at which wheel acceleration is decreased to a first threshold value, the controller selecting the operational mode of the pressure control valve on the basis of the control parameters including wheel acceleration and the projected speed to produce a control signal to operate the pressure control valve to one of the valve positions, and the controller detecting of overrunning of the wheel beyond the vehicle speed to cause a given delay for deriving the projected speed after the timing at which the wheel acceleration decreases across the first threshold.

According to another aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure to increase braking pressure in its first position, to hold the braking pressure at an increased level in its second position, to decrease the braking pressure in its third position, and to hold the braking pressure constant at the decreased level in its fourth position, a wheel speed sensor detecting rotation speed of the wheel and producing a wheel speed indicative signal having a value variation corresponding to detected wheel speed, first means for processing the wheel indicative signal for deriving brake control parameters including wheel acceleration, the first means latching the wheel speed indicative signal value as a projected speed value when derived wheel acceleration decreases across a first deceleration threshold, second means for selecting the operational mode of the pressure control valve on the basis of brake control parameters to produce a control signal to operate the pressure control valve to one of the valve positions, the second means activating the first means for latching the wheel speed indicative signal value with the control signal to operate the pressure control valve to the second position, and third means for comparing the wheel acceleration with a predetermined reference value to cause delay of operation of the first means to latch the wheel speed indicative signal value for a given period of time after wheel acceleration decreases across the first threshold, when wheel acceleration increases across the reference valve before decreasing across the first threshold.

According to a further aspect of the invention, a method for anti-skid brake control for an automotive brake system comprises the steps of:

detecting wheel speed;

deriving wheel acceleration on the basis of detected wheel speed;

latching the detected wheel speed indicative value as a projected speed when derived wheel acceleration decreases across a first threshold value;

controlling a pressure control valve disposed within a hydraulic brake circuit including a wheel cylinder to increase braking pressure in the brake circuit in a first operational mode, to hold braking pressure constant at the increased level in a second operational mode, to decrease the braking pressure in a third operational mode and to hold the braking pressure constant at the decreased level in a fourth operational mode, the second operational mode being selected when the wheel acceleration decreases across the first threshold value, the third mode selected when wheel slippage derived on the basis of the wheel speed and the projected speed increases across a second threshold value, the fourth mode being selected when wheel acceleration increases across a third threshold value, and the first mode being selected when wheel speed reaches a fourth threshold which is derived on the basis of the projected speed and the wheel speed; and detecting wheel acceleration increases greater than a predetermined reference value to cause delay for a given period of time for latching the projected wheel after subsequently detecting wheel acceleration decreasing across the first threshold.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

FIG. 19 is a flowchart of a sample control program executed by the controller unit;

FIG. 20 is a flowchart of a timer overflow program executed periodically as an interrupt program of the main program;

FIG. 23 is a flowchart of an output calculation program for deriving EV and V signals for controlling the operation mode of the electromagnetic valve according to the valve conditions of FIGS. 4, 5 and 6;

DESCRIPTION OF THE PREFERRED EMBODIMENTS

Figure 1:
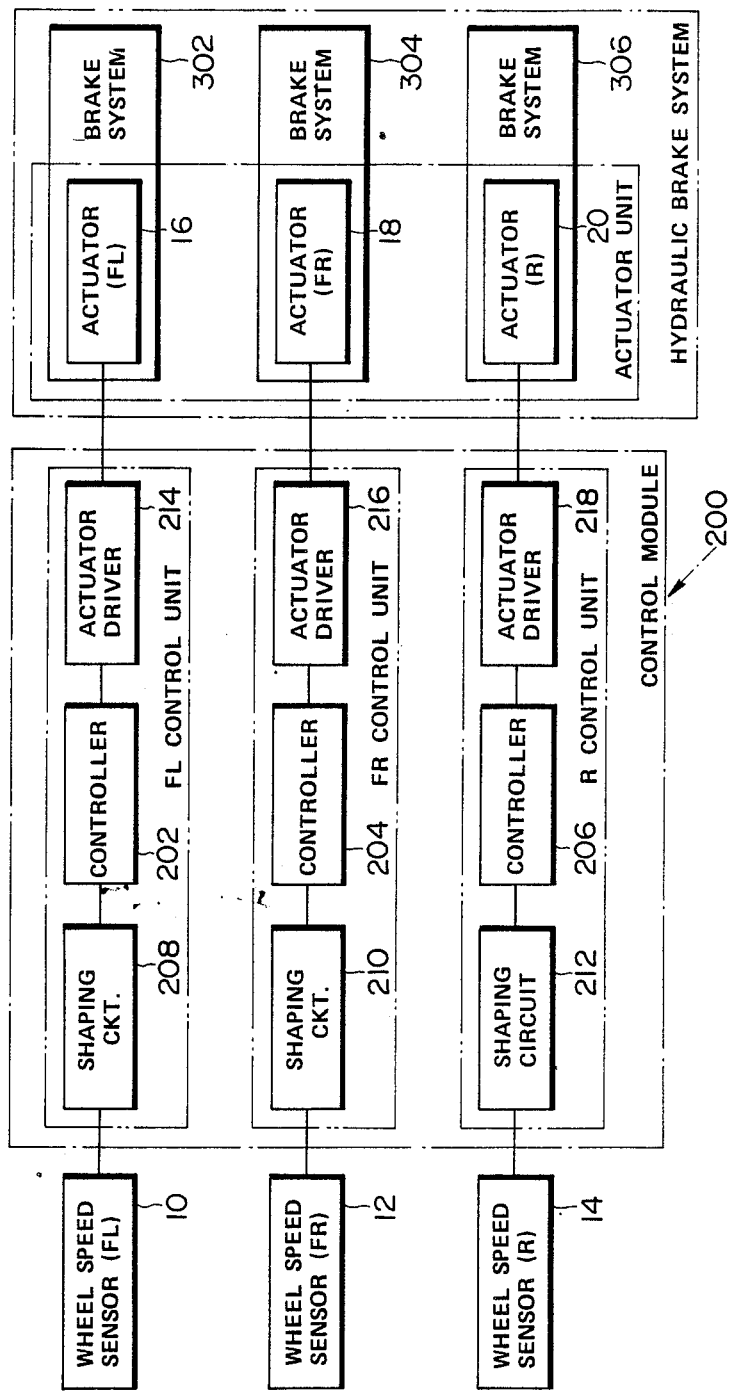
FIG. 1 is a schematic block diagram of the general design of the preferred embodiment of an anti-skid brake control system according to the present invention.

This application is one of eighteen mutually related co-pending Patent Applications in the United States, filed on the same day. All of the eighteen applications have been filed by the common applicant to this application and commonly assigned tot eh assignee of this application. The eighteen applications are identified below:

| Basic Japanese Patent Appln No. Serial No. | Title of the Invention |
|---|---|
| Showa 58-70891 601,326, filed April 17, 1984 | AN AUTOMOTIVE ANTI-SKID BRAKE CONTROL SYSTEM WITH SAMPLING INPUT TIME DATA OF WHEEL SPEED SENSOR SIGNALS |
| Showa 58-70892 601,375, filed April 17, 1984 | METHOD AND SYSTEM FOR SAMPLING INPUT TIME DATA FOR WHEEL SPEED SENSOR IN AN AUTOMOTIVE ANTI-SKID BRAKE CONTROL SYSTEM |
| Showa 58-70893 601,375, filed April 17, 1984 | AUTOMOTIVE ANTI-SKID CONTROL SYSTEM WITH CONTROL OF SAMPLING OF INPUT TIME DATA OF WHEEL SPEED SENSOR SIGNALS AND METHOD THEREFOR |
| Showa 58-70894 601,317, filed April 17, 1984 | ANTI-SKID CONTROL SYSTEM FOR AUTOMOTIVE BRAKE SYSTEM WITH SAMPLE CONTROL FOR SAMPLING INPUT TIMING OF SENSOR SIGNAL PULSES WITH REQUIRED PROCESS IDENTIFICATION AND METHOD FOR SAMPLING |
| Showa 58-70895 601,294, filed April 17, 1984 | ANTI-SKID BRAKE CONTROL SYSTEM INCLUDING A PROCEDURE OF SAMPLING OF INPUT TIME DATA OF WHEEL SPEED SENSOR SIGNALS AND METHOD THEREFOR |
| Showa 58-70896 601,344, filed April 17, 1984 | ANTI-SKID BRAKE CONTROL SYSTEM INCLUDING WHEEL DECELERATION CALCULATION WITH SHORTER LAB-TIME AND METHOD FOR PERFORMING CALCULATION |
| Showa 58-70897 601,338, filed April 17, 1984 | ANTI-SKID BRAKE CONTROL SYSTEM WITH SAMPLE CONTROL OF SENSOR SIGNAL INPUT TIME DATA, AND METHOD THEREFOR |
| Showa 58-70898 601,337, filed April 17, 1984 | ANTI-SKID BRAKE CONTROL SYSTEM WITH CONTROL OF SAMPLING TIMING OF INPUT TIMING VALUES OF WHEEL SPEED SENSOR SIGNAL PULSES |
| Showa 58-70899 601,330, filed April 17, 1984 | ANTI-SKID BRAKE CONTROL SYSTEM FOR AUTOMOTIVE VEHCLE |
| Showa 58-70900 601,364, filed April 17, 1984 | ANTI-SKID BRAKE CONTROL SYSTEM WITH REDUCED DURATION OF WHEEL ACCELERATION AND DECELERATION CALCULATION |
| Showa 58-84088 601,363, filed April 17, 1984 | ANTI-SKID BRAKE CONTROL SYSTEM WITH OPERATIONAL MODE CONTROL AND METHOD THEREFOR |
| Showa 58-84087 & 58-84091 601,329, filed April 17, 1984 | ANTI-SKID BRAKE CONTROL SYSTEM WITH OPERATION CONTROL FOR A PRESSURE REDUCTION FLUID PUMP IN HYDRAULIC BRAKE CIRCUIT |
| Showa 58-84082 601,318, filed April 17, 1984 | METHOD AND SYSTEM FOR DERIVING WHEEL ROTATION SPEED DATA FOR AUTOMOTIVE ANTI-SKID CONTROL |
| Showa 58-84085 601,345, filed April 17, 1984 | METHOD AND SYSTEM FOR DERIVING WHEEL ACCELERATION AND DECELERATION IN AUTOMOTIVE ANTI-SKID BRAKE CONTROL SYSTEM |
| Showa 58-84092 601,293, filed April 17, 1984 | ANTI-SKID BRAKE CONTROL SYSTEM AND METHOD FEATURING VEHICLE BATTERY PROTECTION |
| Showa 58-84081 601,327, filed April 17, 1984 | METHOD AND SYSTEM FOR DERIVING WHEEL ROTATION SPEED DATA FOR AUTOMOTIVE ANTI-SKID CONTROL |

-continued

| Basic Japanese Patent Appln No. Serial No. | Title of the Invention |
|---|---|
| Showa 58-84090 601,258, filed April 17, 1984, now U.S. Pat. No. 4,569,560 issued February 11, 1986 | ANTI-SKID BRAKE CONTROL SYSTEM INCLUDING FLUID PUMP AND DRIVE CIRCUIT THEREFOR |
| Showa 58-102919 & 58-109308 601,295, filed April 17, 1984 | ANTI-SKID BRAKE CONTROL SYSTEM WITH A PLURALITY OF INDEPENDENTLY OPERATIVE DIGITAL CONTROLLERS |

Disclosure of other seventeen applications as identified above are hereby incorporated by reference for the sake of disclosure.

Referring now to the drawings, particularly to FIG. 1, the preferred embodiment of an anti-skid control system according to the present invention includes a control module 200 including a front-left controller unit (FL) 202, a front-right controller unit (FR) 204 and a rear controller unit (R) 206. The controller unit 202 comprises a microprocessor and is adapted to control brake pressure applied to a front left wheel cylinder 30a of a front left hydraulic brake system 302 of an automotive hydraulic brake system 300. Similarly, the controller unit 204 is adapted to control brake pressure applied to the wheel cylinder 34a of a front right wheel (not shown) in the front right hydraulic brake system 304 and the controller unit 206 is adapted to control brake pressure applied to the rear wheel cylinders 38a of the hydraulic rear brake system 306. Respective brake systems 302, 304 and 306 have electromagnetically operated actuators 16, 18 and 20, each of which controls the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the shown brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed Vi is derived, which is an assumed value derived from the wheel speed at which a slip is assumed to zero or approximately zero. The target wheel speed $V_i$ varies at a constant decelerating rate derived from variation of the wheel speed. The target wheel speed is thus correspond to a vehicle speed assumed based on variation of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
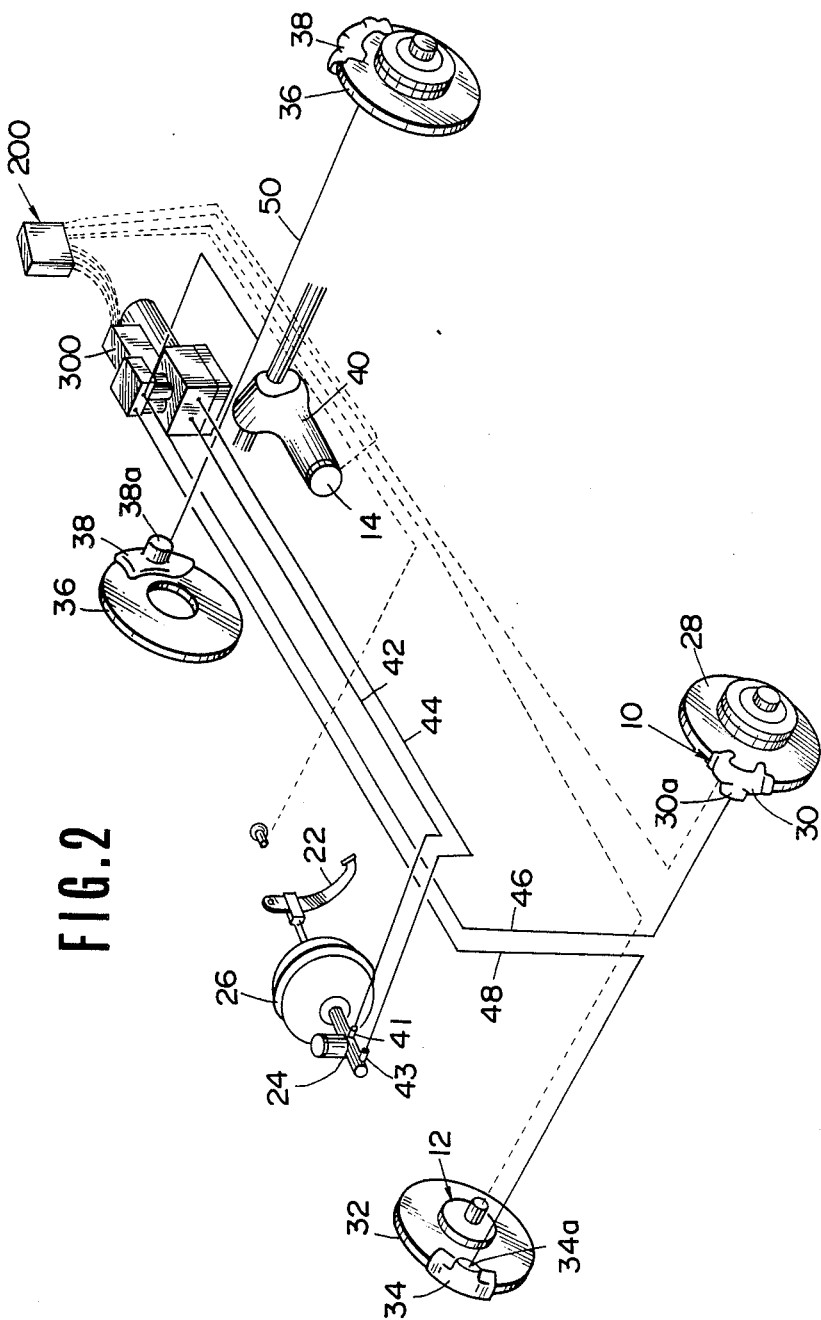
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel-speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 40 for rotation therewith. (See FIG. 8). Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
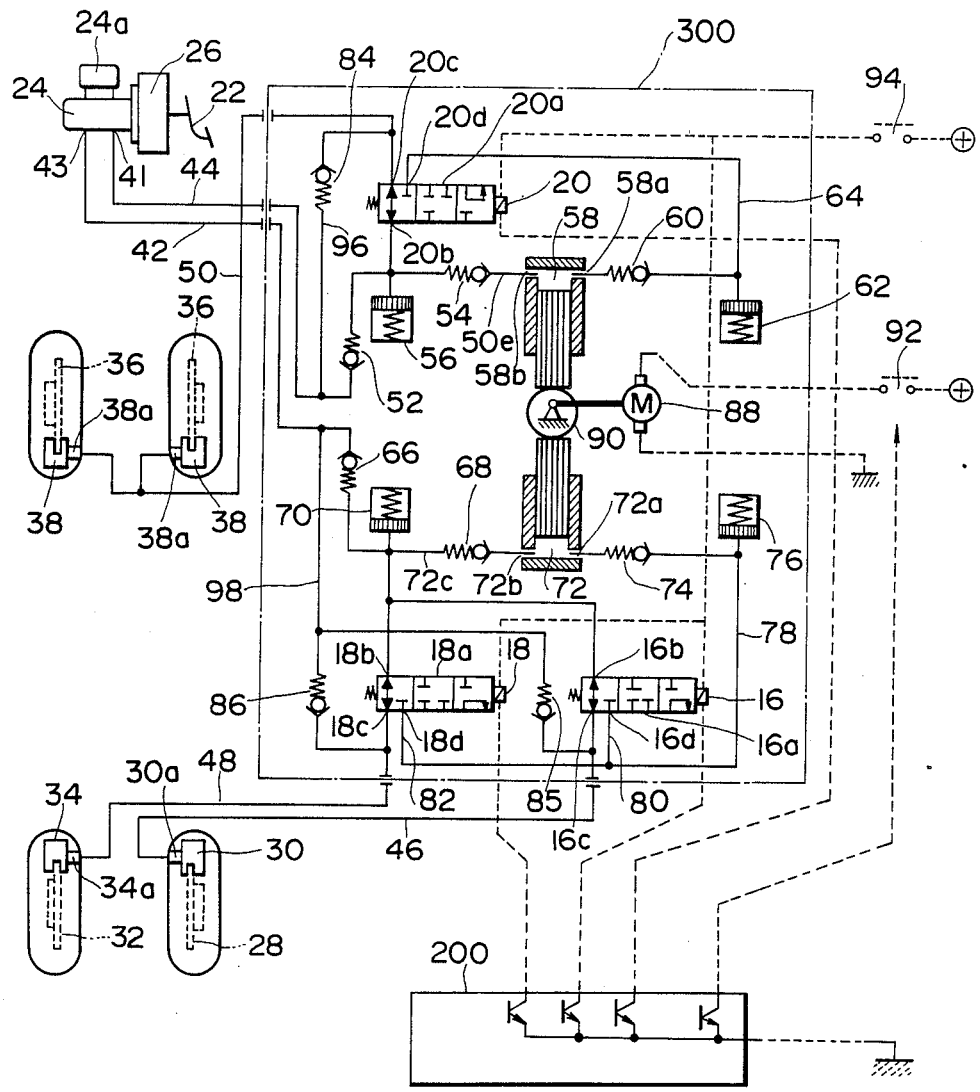
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure line 42. The primary outlet port 41 is connected to the inlet port 20b of the electromagnetic valve 20a, the outlet port 20c of which is connected to the rear wheel cylinders 38a, via the primary pressure line 44. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure check valves 66 and 52 is adapted to prevent the working fluid pressurized by the fluid pump 90 from transmitting pressure surges to the master cylinder 24. Since the fluid pump 90 is designed for quick release of pressure lines 46, 48 the braking pressure in the braking and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass check valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is deenergized in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again deenergized. The electromagnetic valve 16a is thus returns to its initial position to allow the fluid flow between the inlet port 16b and the outlet port 16c so that tee pressurized fluid may flow to the left front wheel cylinder 30a via the braking pressure line 46. As set forth the drain port 16d is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
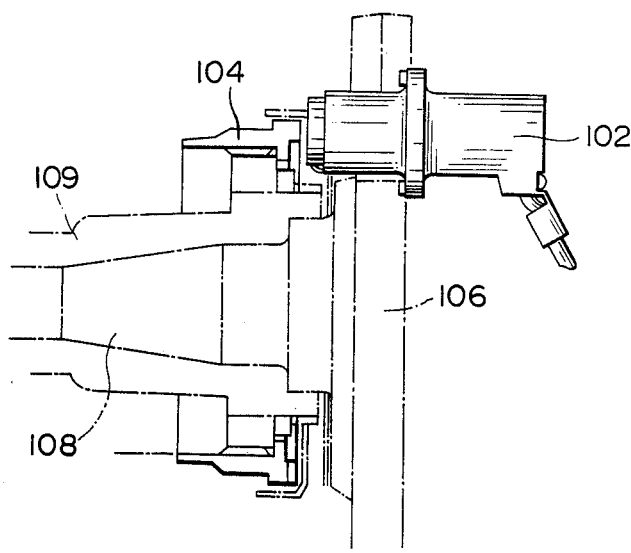
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
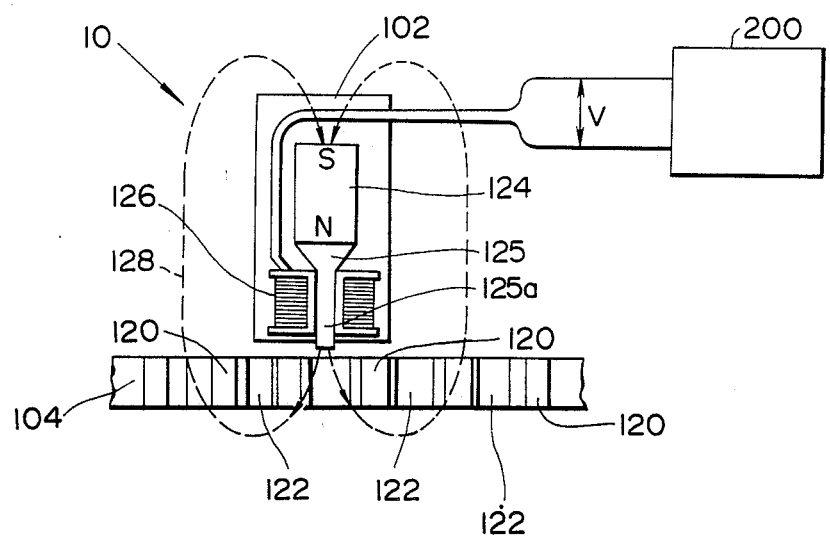
FIG. 9 is an explanatory illustration of the wheel speed sensors of FIGS. 7 and 8.
Figure 10:
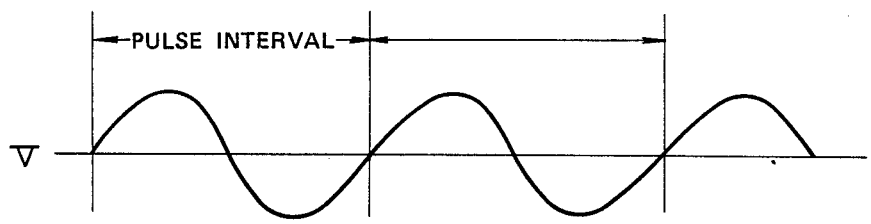
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
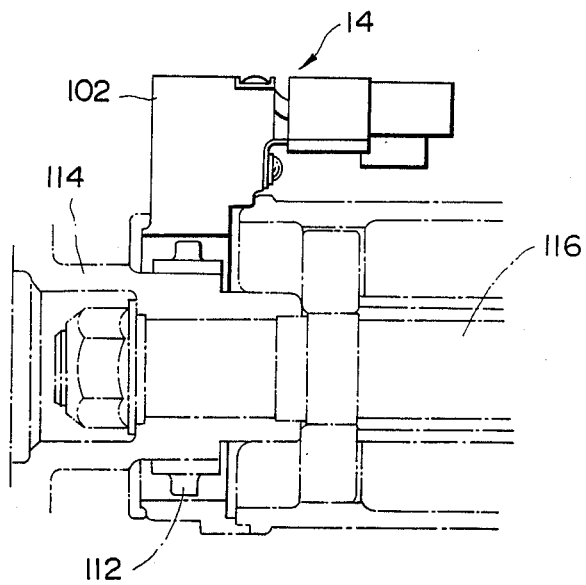
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
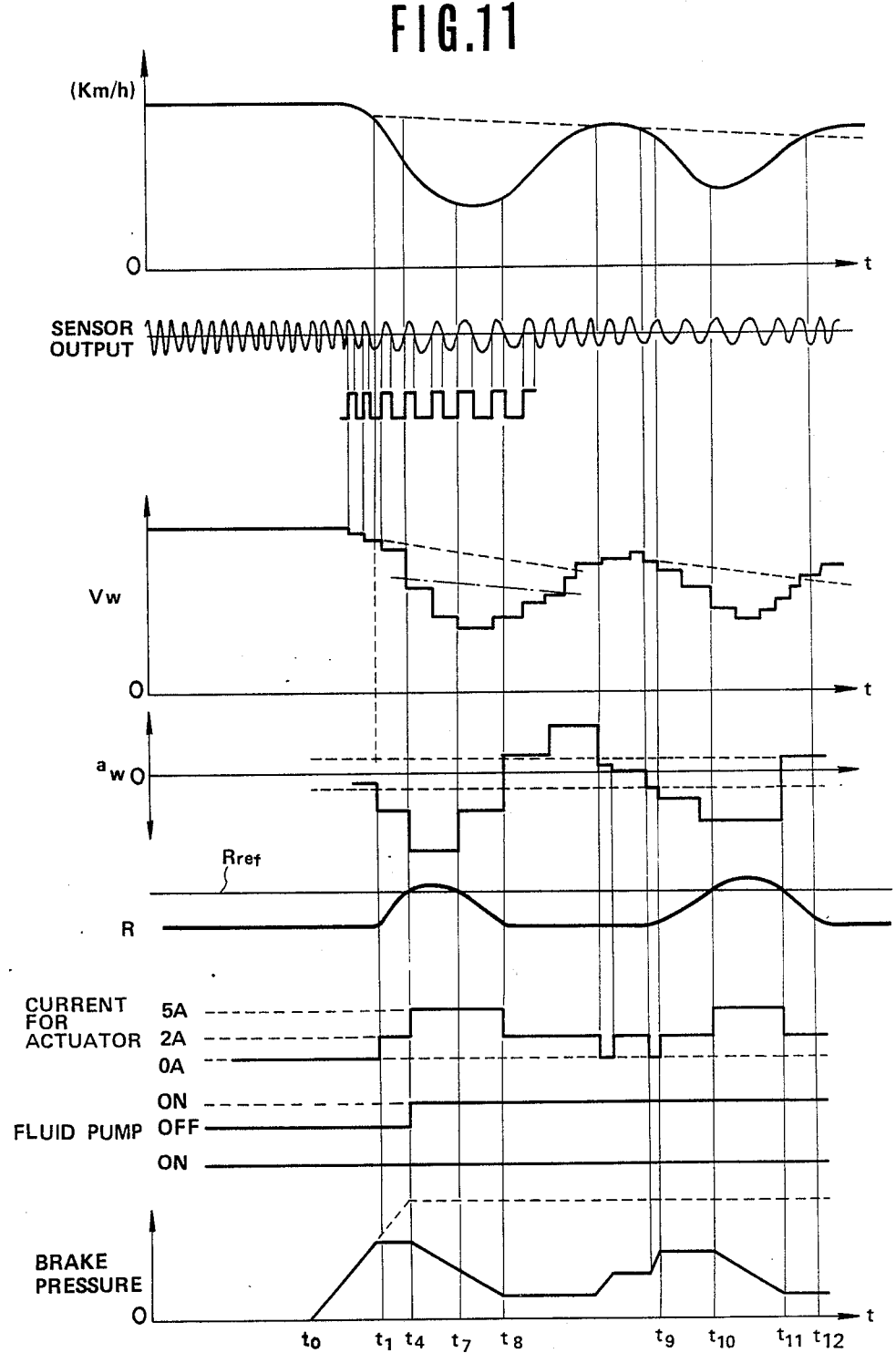
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulses or between the first pulses of groups of relatively-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2$ G, and a predetermined deceleration rate, for example 0.4 G. The subsequent target wheel speed $V_i$ is derived based on the projected speeds $V_v$ in last two skid cycles. For instance, the deceleration rate of the target wheel speed $V_i$ is derived from a difference of the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on input times of three successive sensor pulses. Since the interval of the adjacent sensor signal pulses corresponds to the wheel speed, and the wheel speed is a function of the reciprocal of the interval, by comparing adjacent pulse-to-pulse intervals, a value corresponding to the variation or difference of the wheel speed may be obtained. The resultant may be divided by the period of time in order to obtain the wheel acceleration and deceleration at the unit time. Therefore, the acceleration or deceleration of the wheel is derived from the following equation:

$$a_w = \left( \frac{1}{C-B} - \frac{1}{B-A} \right) \bigg/ \left( \frac{C-A}{2} \right) \tag{1}$$

where A, B and C are the input times of the sensor pulses in the order given.

On the other hand, the slip rate R is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \tag{2}$$

Finally, the controller unit 202 determines the control mode, i.e., release mode, hold mode and application mode from the slip rate R and the wheel acceleration or deceleration $a_w$.

General operation of the controller unit 202 will be briefly explained herebelow with reference to FIG. 11. Assuming the brake is applied at $t_0$ and the wheel deceleration $a_w$ exceeds the predetermined value, e.g. 1.2 G at a time $t_1$, the controller unit 202 starts to operate at a time $t_1$. The first sensor pulse input time ($t_1$) is held in the controller unit 202. Upon receipt of the subsequent sensor pulse at a time $t_2$, the wheel speed $V_w$ is calculated by deriving the current sensor pulse period (dt=$t_2-t_1$) In response to the subsequently received sensor pulses at times $t_3, t_4 \ldots$, the wheel speed values $V_{w2}, V_{w3} \ldots$ are calculated.

On the other hand, at the time $t_1$, the instantaneous wheel speed is taken as the projected speed $V_y$. Based on the projected speed $V_y$ and the predetermined fixed value, e.g. 0.4 G, the target wheel speed $V_i$ decelerating at the predetermined deceleration rate 0.4 G is derived.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_y$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
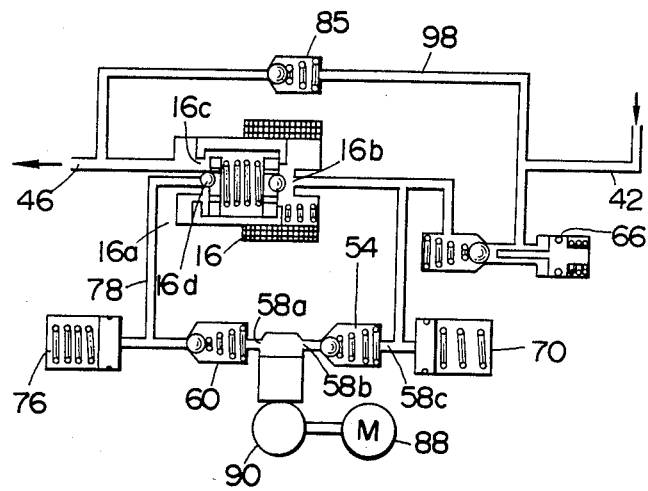
FIG. 4 is an illustration of the operation of an electromagnetic flow control valve employed in the hydraulic circuit, which valve has been shown in an application mode for increasing the fluid pressure in a wheel cylinder.
Figure 5:
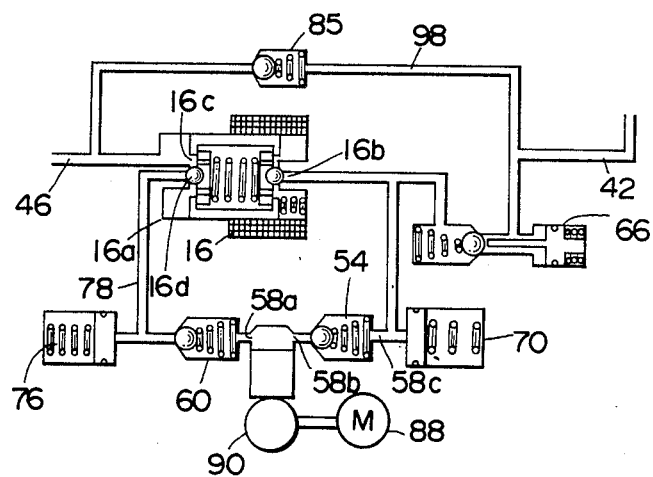
FIG. 5 is a view similar to FIG. 4 but with of the valve being in a hold mode in which the fluid pressure in the wheel cylinder is held at a substantially constant value.
Figure 6:
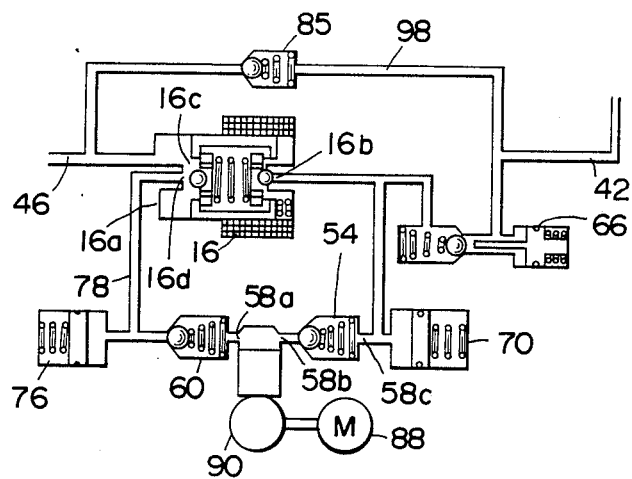
FIG. 6 is a view similar to FIG. 4 but with of the valve being in a release mode in which the fluid pressure in the wheel cylinder is reduced.

In practical brake control operation performed by the preferred embodiment of the anti-skid control system according to the present invention, the electric current applied to the actuator attains a limited value, e.g., 2A to place the electromagnetic valve 30a in the hold mode as shown in FIG. 5 when the wheel speed remains in between the target wheel speed $V_i$ and the slip rate threshold $R_{ref}$. When the slip rate derived from the target wheel speed $V_i$ and the wheel speed $V_w$ becomes equal to or larger than the slip rate threshold $R_{ref}$, then the supply current to the actuator 16 is increased to a maximum value, e.g. 5A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref}$ $-1.2$ G. At the same time, the projected speed $V_y$ is again derived with respect to the wheel speed at which the wheel deceleration $a_w$ becomes equal to or slightly larger than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{y1}$, the instant projected speed is $V_{y2}$, and the period of time is $T_y$, the target wheel speed $V_i$ can be obtained from the following equation:

$$V_i = V_{y2} - (V_{y1} - V_{y2})/T_y \times t_e$$

where $t_e$ is an elapsed time from the time at which the instant projected speed $V_{y2}$ is obtained.

Based on the input timing to $t_1, t_2, t_3, t_4 \ldots$, deceleration rate $a_w$ is derived from the foregoing equation (1).

In addition, the projected speed $V_y$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4 G for the first skid cycle of control operation, the target wheel speed $V_i$ is calculated. According to equation (2), the slip rate R is calculated, using successive wheel speed values $V_{w1}, V_{w2}, V_{w3} \ldots$ as parameters. The derived slip rate R is compared with the slip rate threshold $R_{ref}$. As the wheel speed $V_w$ drops below the projected speed $V_y$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_y$) and the solid trace in the graph of $V_w$ in FIG. 11. When the wheel speed $V_w$ becomes equal to the target wheel speed $V_w$ (at a time $t_8$), the controller unit 202 switches the control mode from the hold mode to the application mode.

As can be appreciated from the foregoing description, the control mode will tend to cycle through the control modes in the order application mode, hold mode, release mode and hold mode, as exemplified in the period of time from $t_1$ to $t_8$. This cycle of variation of the control modes will be referred to hereafter as "skid cycle". Practically speaking, there will of course be some hunting and other minor deviations from the standard skid cycle.

The projected speed $V_y$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family thereof, in order to enable calculation of the target wheel speed for the first skid cycle operation. Specifically, in the shown example, the projected speed $V_y$ at the time $t_1$ will be derived from the wheel speed $V_{w1}$ at that time. Using the predetermined deceleration rate, the projected speed will be calculated at each time the wheel deceleration $a_w$ in the application mode reaches the deceleration threshold $a_{ref}$.

At time $t_9$, the wheel deceleration $a_w$ becomes equal to or slightly larger than the deceleration threshold $a_{ref}$, then the second projected speed $V_{y2}$ is obtained at a value equal to the instantaneous wheel speed $V_w$ at the time $t_9$. According to the abovementioned equation, the deceleration rate da can be obtained $$da = (V_{y1} - V_{y2})/(t_9 - t_1)$$

Based on the derived deceleration rate da, the target wheel speed $V_i'$ for the second skid cycle of control operation is derived by:

$$V_i' = V_{v2} - da \times t_e$$

Based on the derived target wheel speed, the slip rate threshold $R_{ref}$ for the second cycle of control operation is also derived. As will be appreciated from FIG. 11, the control mode will be varied during the second cycle of skid control operation, to hold mode at time $t_9$ at which the wheel deceleration reaches the deceleration threshold $a_{ref}$ as set forth above, to release mode at time $t_{10}$ at which the slip rate R reaches the slip rate threshold $R_{ref}$, to hold mode at time $t_{11}$ at which the slip rate R is recovered to the slip rate threshold $R_{ref}$, and to application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2A) is applied at times $t_1$, $t_7$, $t_9$ and $t_{11}$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_1$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$ at time $t_8$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 12:
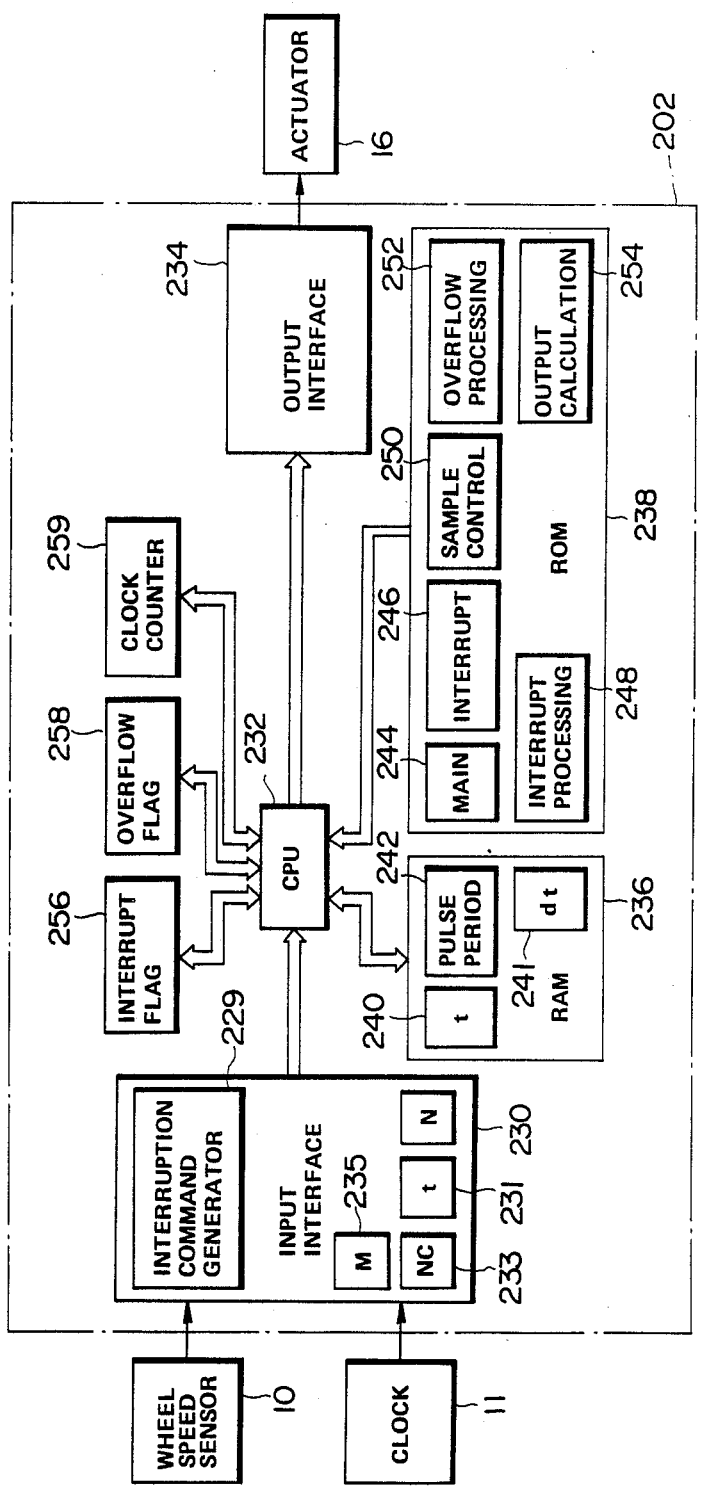
FIG. 12 is a block diagram of the preferred embodiment of a controller unit in the anti-skid brake control system according to the present invention.

Referring to FIG. 12, the controller unit 202 includes an input interface 230, CPU 232, an output interface 234, RAM 236 and ROM 238. The input interface 230 includes an interrupt command generator 229 which produces an interrupt command in response to every sensor pulse. In ROM, a plurality of programs including a main program (FIG. 13), an interrupt program (FIG. 15), an sample control program (FIG. 19), a timer overflow program (FIG. 20) and an output calculation program (FIG. 23) are stored in respectively corresponding address blocks 244, 246, 250, 252 and 254.

The input interface also has a temporary register for temporarily holding input timing for the sensor pulses. RAM 236 similarly has a memory block holding input timing for the sensor pulses. The contents of the memory block 240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of the U.S. Pat. No. 4,408,290 is hereby incorporated by reference. RAM also has a memory block 242 for holding pulse intervals of the input sensor pulses. The memory block 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the a capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory block 240 of RAM 236.

The operation of the controller unit 202 and the function of each elements mentioned above will be described with reference to FIGS. 13 to 30.

Figure 13:
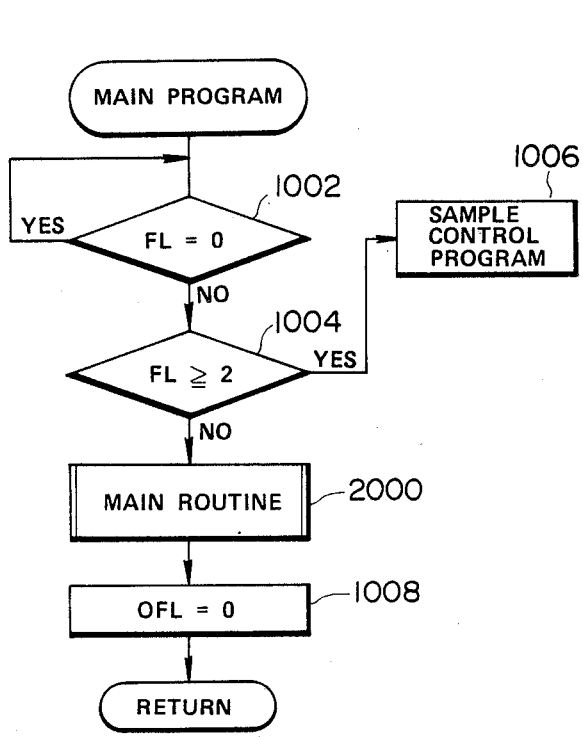
FIG. 13 is a flowchart of a main program of a microcomputer constituting the controller unit of FIG. 12.

FIG. 13 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 13 but shown in more detail in FIG. 19. If FL=1, then the control process is according to plan, and control passes to a main routine explained later with reference to FIG. 15. Finally, after completion of the main routine, a time overflow flag OFL is reset to signify successful completion of another sample processing cycle, and the main program ends.

Figure 14:
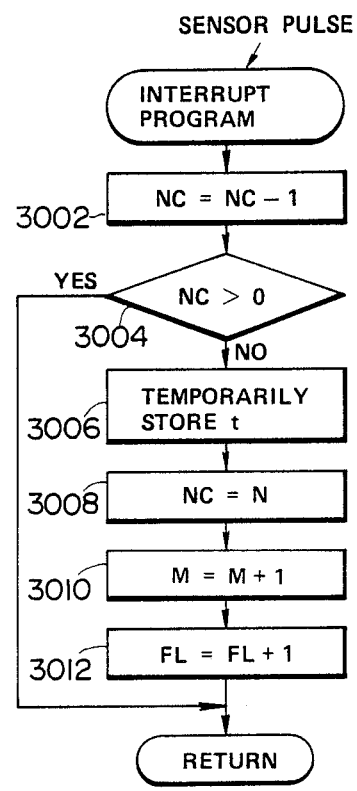
FIG. 14 is a flowchart of an interrupt program executed by the controller unit.

FIG. 14 shows the interrupt program stored in the memory block 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at $-1$. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 ($1-1=0$) at the block 3002 and thus is zero, the answer of the block 3004 is NO. In this case, the clock counter value t is latched in a temporary register 231 in the input interface 230 at a block 3006. The counter value NC of the auxiliary counter 233 is thereafter assigned the value N in a register 235, which register value N is representative of frequency dividing ratio determined during execution of the main routine explained later, at a block 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a block 3012. After the block 3012, interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration and deceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT=(C-B)-(B-A)\geq S(4\text{ ms.}) \qquad (3)$$

where A, B and C are the input times of three successive sensor pulse groups.

Figure 16:
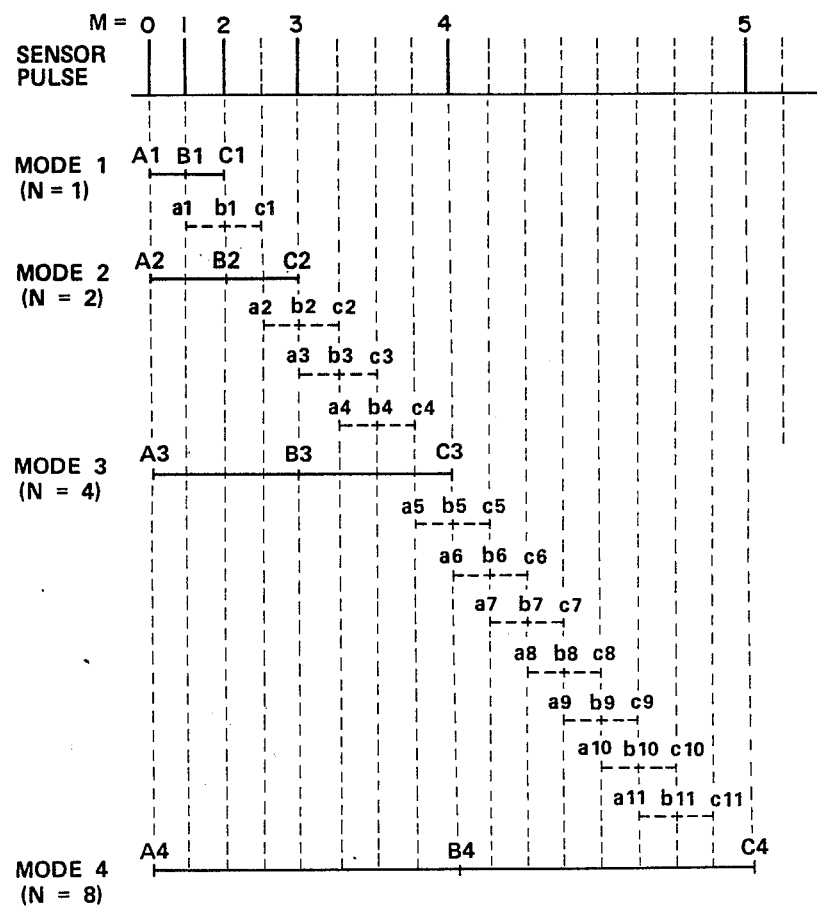
FIG. 16 is an explanatory diagram of the input timing sampling modes and variations thereof.

The controller unit 202 has different sample modes, i.e. MODE 1, MODE 2, MODE 3 and MODE 4 determining the number of sensor pulses in each sample period group. As shown in FIG. 16, in MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

For instance, in FIG. 16, the sensor pulses $A_1$, $B_1$ and $C_1$ are sampled under MODE 1. In MODE 2, the sensor pulses $a_1$ and $c_1$ are ignored and the sensor pulses $A_1$ ($=A_2$), $B_2$ ($=b_1$) and $C_2$ ($=b_2=a_3$) are sampled. In MODE 3, the three sensor pulses $c_2$ ($=b_3=a_4$), $c_3$ ($=b_4$) and $c_4$ following B ($=c_2$) are ignored and the sensor pulses $A_3$ ($=A_1=A_2$), $B_3$ ($=b_2=a_3$) and $C_3$ ($=b_5=a_6$) are sampled. In MODE 4, the seven sensor pulses $c_5$ ($=b_6=a_7$), $c_6$ ($=b_7=a_8$), $c_7$ ($=b_8=a_9$), $c_8$ ($=b_9=a_{10}$), $c_9$ ($=b_{10}=a_{11}$), $c_{10}$ ($=b_{11}$) and $c_{11}$ following $B_4$ ($=c_3$) ignored and the sensor pulses $A_4$ ($=A_1=A_2=A_3$), $B_4$ ($=C_3=b_5=a_6$) and $C_4$ are sampled.

Figure 15:
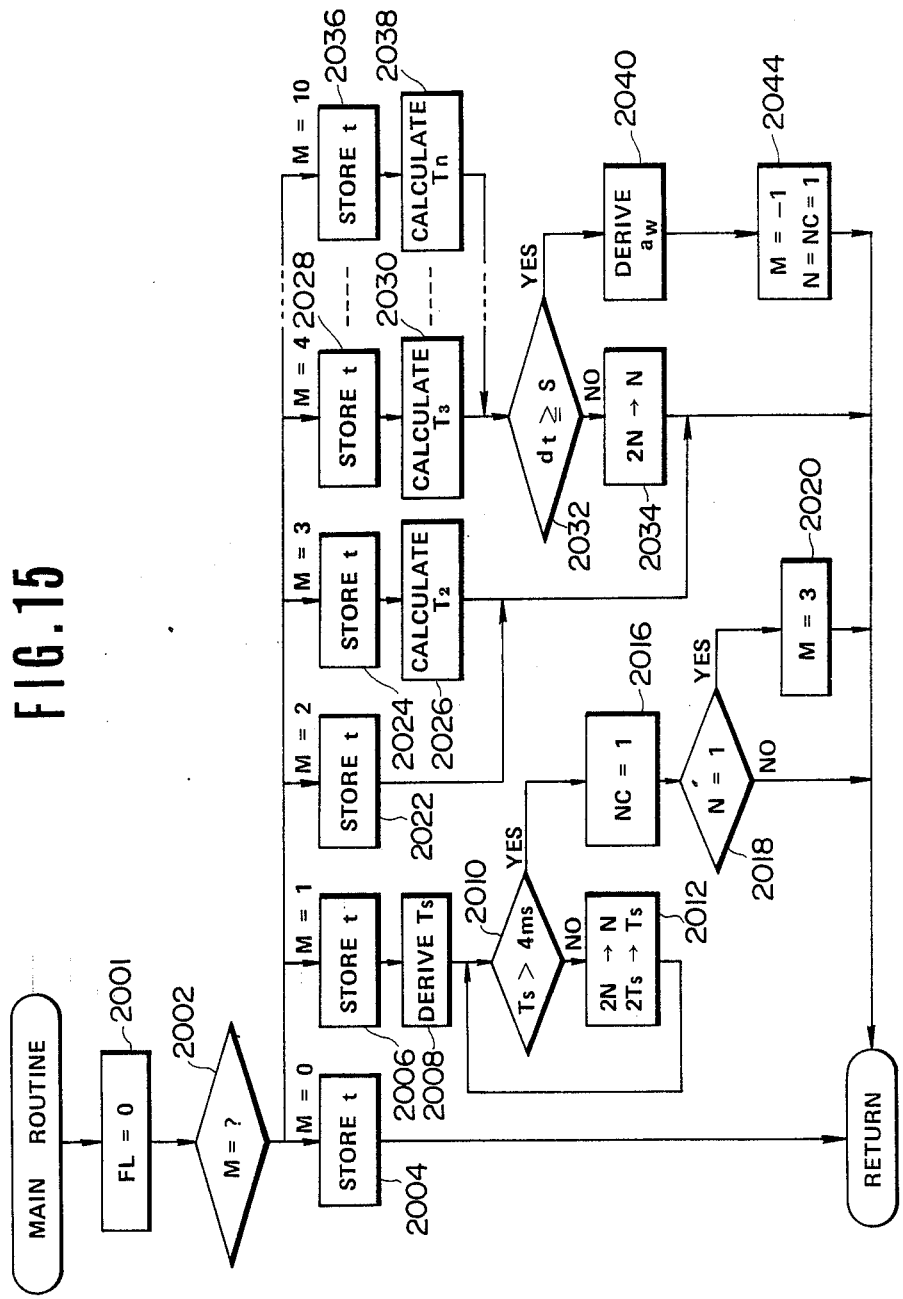
FIG. 15 is a flowchart of a main routine in the main program of FIG. 13.

Referring to FIG. 15, the main routine serves to periodically derive an updated wheel acceleration rate value $a_w$. In general, this is done by sampling larger and larger groups of pulses until the difference between the durations of the groups is large enough to yield an accurate value. In the main routine, the sample flag FL is reset to zero at a block 2001. Then the counter value M of the auxiliary counter 233, indicating the current sample period of the current $a_w$ calculation cycle, is read out at a block 2002 to dictate the subsequent program steps.

Specifically, after the first sample period (M=0), the input timing t temporarily stored in the temporary register 231 corresponding to the sensor pulse number (M=0) is read out and transferred to a memory block 240 of RAM at a block 2004, which memory block 240 will be hereafter referred to as "input timing memory". Then control passes to the block 1008 of the main program. When M=2, the corresponding input timing t is read out from the temporary register 231 and transferred to the input timing memory 240 at a block 2006. Then, at a block 2008, a pulse interval Ts between the sensor pulses of M=1 is derived from the two input timing values in the input timing memory 240. That is, the pulse interval of the sensor pulse (M=1) is derived by:

$$Ts = t_1 - t_0$$

where $t_1$ is input time of the sensor pulse M1; and
$t_0$ is input time of the sensor pulse M0.

The derived pulse interval Ts of the sensor pulse M1 is then compared with a reference value, e.g. 4 ms., at a block 2010. If the pulse interval $T_s$ is shorter than the reference value, 4 ms., control passes to a block 2012 wherein the value N and the pulse interval $T_s$ are multiplied by 2. The doubled timing value ($2T_s$) is again compared with the reference value by returning to the block 2010. The blocks 2010 and 2012 constitute a loop which is repeated until the pulse interval ($2nT_s$) exceeds the reference value. When the pulse interval ($2nT_s$) exceeds the reference value at the block 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a block 2016. The register value N is then checked for a value of 1, at a block 2018. If N=1, then the auxiliary counter value M is set to 3 at a block 2020 and otherwise control returns to the main program. When the register value N equals 1, the next sensor pulse, which would normally be ignored, will instead be treated as the sensor pulse having the sample period number $M=3$.

In the processing path for the sample period number $M=3$, the corresponding input timing is read from the corresponding address of the temporary register 231 and transferred to the input timing memory 240, at a block 2024. The pulse interval $T_2$ between the sensor pulses at $M=1$ and $M=3$ is then calculated at a block 2026. The derived pulse interval $T_2$ is written in a storage section of a memory block 242 of RAM 236 for a current pulse interval data, which storage section will be hereafter referred at as "first pulse interval storage" and which memory block 242 will be hereafter referred to as "pulse interval memory". After the block 2026, control returns to the main program to await the next sensor pulse, i.e. the sensor pulse for sample period number $M=4$.

When the sensor pulse for $M=4$ is received, the value t of the temporary register 231 is read out and transferred to the input timing memory 240 at block 2028. Based on the input timing of the sensor pulses for $M=3$ and $M=4$, the pulse interval $T_3$ is calculated at a block 2030. The pulse interval $T_3$ derived at the block 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a block 2032 the contents of the first and second storages, i.e. the pulse interval data $T_2$ and $T_3$ are read out. Based on the read out pulse interval data $T_2$ and $T_3$, a pulse interval difference dT is calculated at block 2032 and compared with the pulse interval threshold S to determine whether or not the pulse interval difference dT is large enough for accurate calculation of wheel acceleration or deceleration $a_w$. If so, process goes to the block 2040 to calculate the wheel acceleration or deceleration according to the equation (1). The register value N is then set to 1 at the block 2044 and thus MODE 1 is selected. In addition sample period number M is reset to $-1$, and the $a_w$ derivation cycle starts again. On the other hand, if at the block 2032 the pulse interval difference dT is too small to calculate the wheel acceleration or deceleration $a_w$, then the value N is multiplied by 2 at a block 2034. Due the updating of the value N, the sample mode of the sensor pulses is shifted to the next mode.

- When the block 2034 is performed and thus the sample mode is shifted to MODE 2 with respect to the sensor pulse of $M=4'$, the sensor pulse $c_2$ input following to the sensor pulse of $M=4'$ is ignored. The sensor pulse $c_3$ following to the ignored sensor pulse $c_2$ is then taken as the sensor pulse to be sampled as $M=3''$. At this time, the sensor pulse of $M=4'$ is treated as the sensor pulse of $M=2''$ and the sensor pulse of $M=2$ is treated as the sensor pulse of $M=1''$. Therefore, calculation of the interval difference dT and discrimination if the derived interval difference dT is greater than the pulse interval threshold S in the block 2032 will be carried out with respect to the sensor pulse $c_3$ which will be treated as the sensor pulse of $M=4''$. The blocks 2032 and 2034 are repeated until the interval difference greater than the pulse interval threshold S is obtained.

The procedure taken in each cycle of repetition of the blocks 2032 and 2034 is substantially same as that set forth above.

As set forth above, by setting the counter value NC of the auxiliary counter 233 to 1 at the block 2016, the input timing of the sensor pulse received immediately after initially deriving the sample mode at the blocks 2010 and 2012 will be sampled as the first input timing to be used for calculation of the wheel acceleration and deceleration. This may be contrasted with the procedure taken in the known art.

Figure 18:
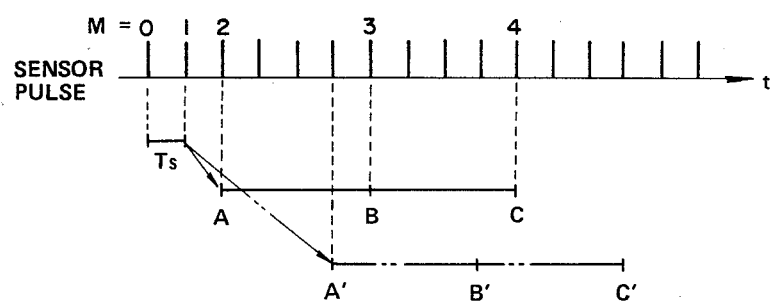
FIG. 18 is a diagram of the period of time during which sensor pulses are sampled in accordance with the present invention, which period of time is compared with that used in the typical prior art.

FIG. 18 shows timing of calculation of the wheel acceleration and deceleration in comparison with the calculation timing of the wheel acceleration and deceleration in the prior art. As will be appreciated from FIG. 18, in the prior art, after deriving the sample mode so that the pulse interval $T_s$ is longer than the reference value, e.g. 4 ms, the first sensor pulse A' is sampled after thinning the corresponding number of sensor pulses e.g. 3 sensor pulses in the shown case. On the other hand, the first sensor pulse A, according to the present invention, can be sampled with respect to the sensor pulse input immediately after deriving the sample mode. As will be appreciated herefrom, sample timing according to the present invention is faster than that in the prior art so that calculation of the wheel acceleration and deceleration can be performed at an earlier timing than that in the conventional art. In other words, the time lag of wheel acceleration/ deceleration calculation due to sensor pulse grouping can be shortened.

Figure 17:
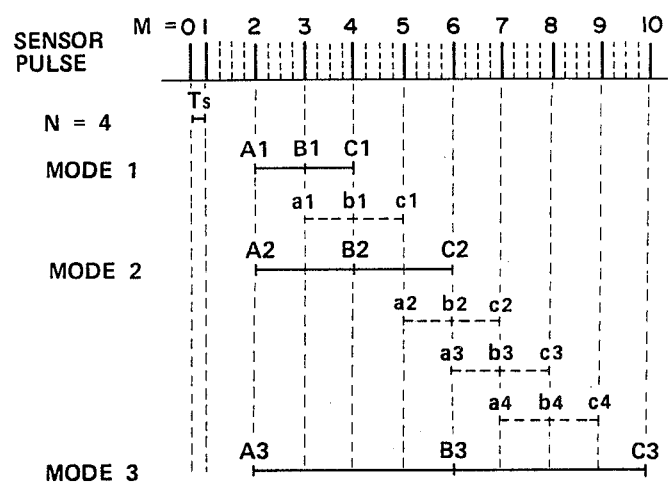
FIG. 17 is another explanatory diagram of the sampling timing of the sensor pulse input timing.

FIG. 17 shows a modified procedure can be taken for obtaining the interval difference dT larger than the pulse interval threshold S. In this modification, SUB-MODE as illustrated is used instead of performing the block 2034 to shift the sample mode of FIG. 16.

In this modification, when MODE 3 is selected during execution of the main routine of FIG. 15, at the blocks 2010, 2012 and 2016, the controller unit 202 is operating under MODE 3, first the sensor pulses $A_1'$, $B_1'$ and $C_1'$ are sampled as shown in FIG. 17. The pulse interval difference between $(C_1'-B_1')$ and $(B_1'-A_1')$ is calculated in response to the sensor pulse $C_1'$ ($M=4$). This operation for detecting the interval difference dT larger than the pulse interval threshold S corresponds substantially to the operation at the blocks 2032, in the main routine of FIG. 15. If the determined pulse interval difference dT is equal to or greater than the pulse interval threshold S, the wheel acceleration or deceleration will be calculated using the derived pulse interval difference dT (SUB-MODE 1) at the block 2040 of the main routine of FIG. 15. On the other hand, if the derived pulse interval difference dT is less than the pulse interval threshold S, the sensor pulses $A_2'$ ($=A_1'$:$M=2$), $B_2'$ ($=C_1'$:$M=4$) and $C_2'$ ($M=6$) are sampled in SUB-MODE 2. If the pulse interval difference derived from the input timing of $A_2'$, $B_2'$ and $C_2'$ is less than the pulse interval threshold S, then the controller unit 202 shifts the operation mode into SUB-MODE 3 in which the sensor pulses $A_3'$ ($=A_1'$ $=A_2'$:$M=2$), $B_3'$ ($=C_2'$:$M=6$) and $C_3'$ ($M=10$) are sampled.

In both of SUB-MODEs 2 and 3, calculation for deriving the wheel acceleration or deceleration $a_w$ relative to the sensor pulses M5, M6, M7, M8 and M9 are performed with taking the input timing of two proceeding sensor pulses similarly to the procedure performed at SUB-MODE 1 when the interval difference dT larger than the pulse interval threshold S can be detected with respect to M7, M8 or M9, for example.

As will be appreciated herefrom, SUB-MODE referred to hereabove mean further variations of the sensor pulse sample mode in order to obtain the interval difference dT greater than the pulse interval threshold S for enabling calculation of the wheel acceleration and deceleration at the block 2040 of the main routine of FIG. 15. With the foregoing modification of FIG. 17, even when the interval difference dT greater than the pulse interval threshold S is obtained with respect to the sensor pulse which has to be thinned under the procedure of FIG. 16, the wheel acceleration and deceleration can be derived for reducing loss time. Further, according to this modified procedure, the calculation timing of the wheel acceleration and deceleration can follow relatively abrupt change of the wheel speed.

In accordance with the shown embodiment, the derived wheel acceleration $a_w$ as derived at the block 2040 is compared with a reference value $a_2$ which is set greater than another reference value $a_1$ as an operational mode switching criteria for switching operational mode from RELEASE mode to HOLD mode and will be described later. Comparing of the derived wheel acceleration $a_w$ and the reference value $a_2$ is carried out at a block 2041 subsequent to the block 2040. When the wheel acceleration $a_w$ is equal to or greater than the reference value $a_2$, a delay demand flag $FL_{dy}$ is set at a block 2042 which is to be used in a process for projecting the projected speed $V_y$ explained later. On the other hand, when the wheel acceleration $a_w$ is smaller than the reference value $a_2$ as checked at the block 2041, then the delay demand flag $FL_{dy}$ is reset at a block 2043.

The delay demand flag $FL_{dy}$ is set in a flag register 257 in the controller unit illustrated in FIG. 11.

FIG. 19 shows the sample control program stored in the memory block 250 of ROM 238. This sample control program is executed when the sample flag FL reaches a predetermined value. In the shown embodiment, the sample control program is executed when the sample flag value FL equals 2. When the sample flag value FL=2 at the block 1004 in FIG. 13, then the sample control program is executed to multiply the auxiliary counter value N by 2, at a block 4002 of FIG. 19. At the same time, the auxiliary counter value NC is set to 1. Thereafter, the sample flag is reset to zero at a block 4004.

The sample control program of FIG. 19 provides a quick and simple adjustment of the sampling mode for both initial start-up and cases where the wheel accelerates so quickly that two sampling periods are completed within a single acceleration rate $a_w$ derivation cycle. Setting N equal to 2N in block 4002 doubles the sample size and so effectively doubles the sample period and setting NC to 1 ensures that the sampling will restart immediately with the next sensor pulse.

FIG. 20 shows the timer overflow program stored in the memory block 252 of ROM. As set forth above, the clock counter 259 used in the shown embodiment has the capacity to count the clock pulses from the clock generator 11 for 64 ms. Therefore, the timer overflow program is executed as an interrupt program whenever the counter value of the clock counter 259 reaches its maximum value (counter is full counted), i.e. every 64 ms. Upon starting execution of the timer overflow program, the timer overflow value OFL is incremented by 1, at a block 4010. The overflow value OFL is then checked at a block 4012. If the overflow value OFL is less than a given value, e.g. 2, then control returns to the main routine of the main program. Since the timer overflow value OFL is cleared at the end of the main program at the block 1008, if the timer overflow program is executed twice during one cycle of execution of main program, the overflow value OFL would become 2. In this case, the answer at the block 4012 would be YES and the wheel speed value $V_w$ would be set to zero and the wheel acceleration and deceleration value $a_w$ would also be set to zero.

Figure 21:
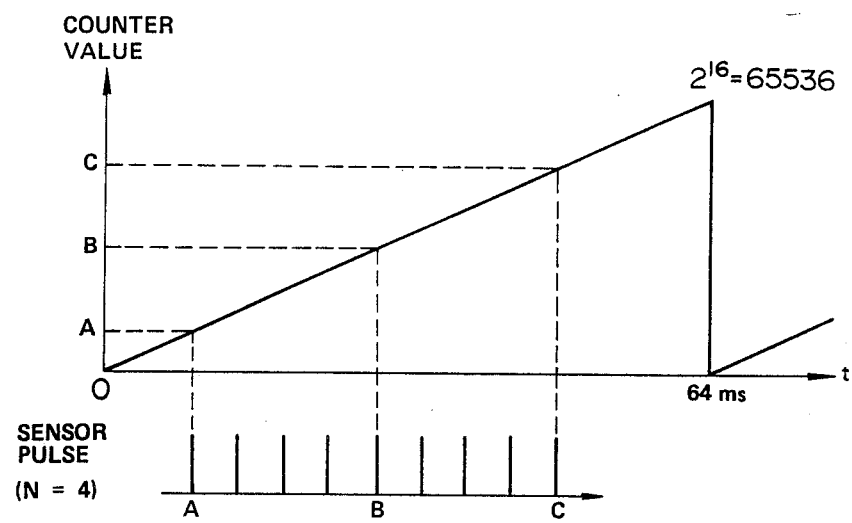
FIG. 21 is a graph of the variation of a counter value of a clock counter in the preferred embodiment of controller unit.
Figure 22:
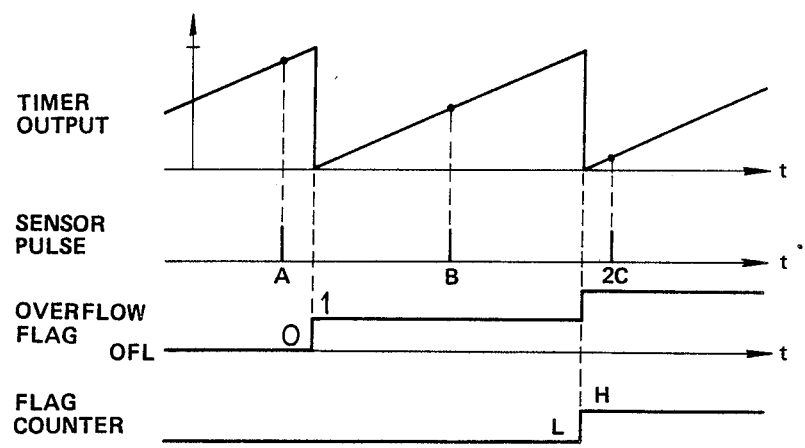
FIG. 22 is a timing chart of the timer overflow which is shown in relation to the value of the timer overflow interrupt flag.
Figure 24:
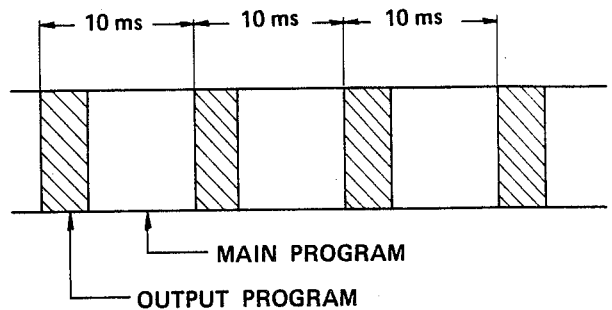
FIGS. 24 and 25 are diagrams of execution timing of the output calculation program in relation to the main program.
Figure 25:
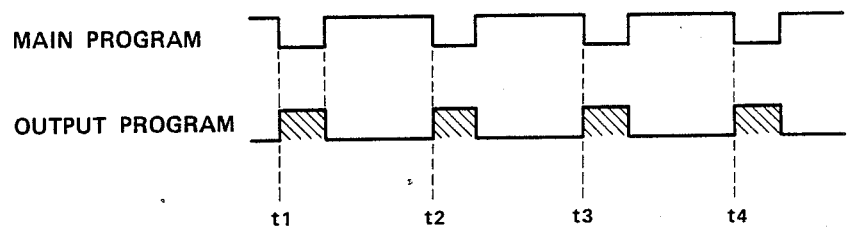

For instance, if three successive sensor pulses are produced within the period of time for which the clock counter 259 counts the clock pulses from the clock signal generator, as shown in FIG. 21, the input timing of respective sensor pulses may be as shown at A, B and C, corresponding to the counter values $C_A$, $C_B$ and $C_C$. The overflow value OFL remains at zero in response to each of the sensor pulses A, B and C, since the sensor pulses are received before the counter time elapses. Therefore, the first time the timer overflow program is executed after receiving the sensor pulse C, the timer overflow value is incremented by 1 during execution of the timer overflow program at the block 4010. In this case, the timer overflow value OFL is still only 1 which is smaller than the limit checked for at the block 4012. On the other hand, if the sensor pulses are produced at intervals relatively long so that the timer overflow program can be executed twice before three successive sensor pulses are sampled, as shown in FIG. 23, then the wheel is movely so slowly that wheel acceleration $a_w$ can not be reliably calculated.

Therefore, in the timer overflow program, as shown in FIG. 20, the wheel speed $V_w$ and the wheel acceleration or deceleration $a_w$ are set to zero at the block 4014. By setting both the wheel speed $V_w$ and the wheel acceleration and deceleration $a_w$ to zero, serious errors will be avoided.

FIG. 23 shows the output program for deriving the wheel speed $V_w$, wheel acceleration and deceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory block 254 and adapted to be read out periodically, e.g. every 10 ms, to be executed as an interrupt program. The output calculation program is executed in the time regions shown in hatching in FIGS. 24 and 25.

During execution of the output calculation program, the pulse interval T is read out from a memory block 241 of RAM which stores the pulse interval, at a block 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. Manner of deriving the target wheel speed $V_i$ has been illustrated in the U.S. Pat. No. 4,392,202 to Toshiro MATSUDA, issued on July 5, 1983, U.S. Pat. No. 4,384,330 also to Toshiro MATSUDA, issued May 17, 1983 and U.S. Pat. No. 4,430,714 also to Toshiro MATSUDA, issued on Feb. 7, 1984, which are all assigned to the assignee of the present invention. The disclosure of the above-identified three United States Patents are hereby incorporated by reference for the sake of disclosure. In addition, the method of deriving the wheel speed $V_w$ may be appreciated from FIG. 31. As is obvious herefrom, the target wheel speed $V_i$ is derived as a function of wheel speed deceleration as actually detected. For instance, the wheel speed $V_w$ at (a) of FIG. 30 at which the wheel deceleration $a_w$ exceeds the deceleration threshold $a_{ref}$, e.g. $-1.2$ G is taken as one reference point for deriving the target wheel speed $V_i$. The wheel speed at (b) of the current skid cycle, at which the wheel deceleration $a_w$ also exceeds the deceleration threshold $a_{ref}$, is taken as the other reference point. In addition, the period of time between the points a and b is measured. Based on the wheel speed $V_{w1}$ and $V_{w2}$ and the measured period P, the deceleration rate $dV_i$ is derived from:

$$dV_i = (V_{w1} - V_{w2})/P \qquad (4)$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

Figure 26:
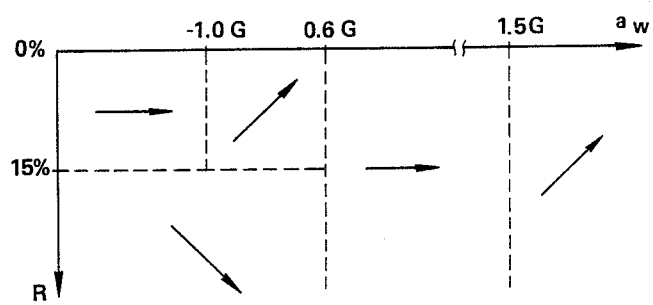
FIG. 26 is a table determining the operation mode of the actuator 16, which table is accessed in terms of the wheel acceleration and deceleration and the slip rate.

At a block 5008, the slip rate R is calculated according to the foregoing formula (2). Subsequently, the operational mode is determined on the basis of the wheel acceleration and deceleration $a_w$ and the slip rate R, at a block 5010. FIG. 26 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower than $-1.0$ G and the application mode is selected when the wheel acceleration and deceleration $a_w$ is in the range of $-1.0$ G to 0.6 G. On the other hand, when the slip rate R remains above 15%, the release mode is selected when the wheel acceleration and deceleration $a_w$ is equal to or less than 0.6 G, and the hold mode is selected when the wheel acceleration and deceleration is in a range of 0.6 G to 1.5 G. When the wheel acceleration and deceleration $a_w$ is equal to or greater than 1.5 G, the application mode is selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentally to be determined in accordance with the response characteristics of the actuator.

Figure 27:
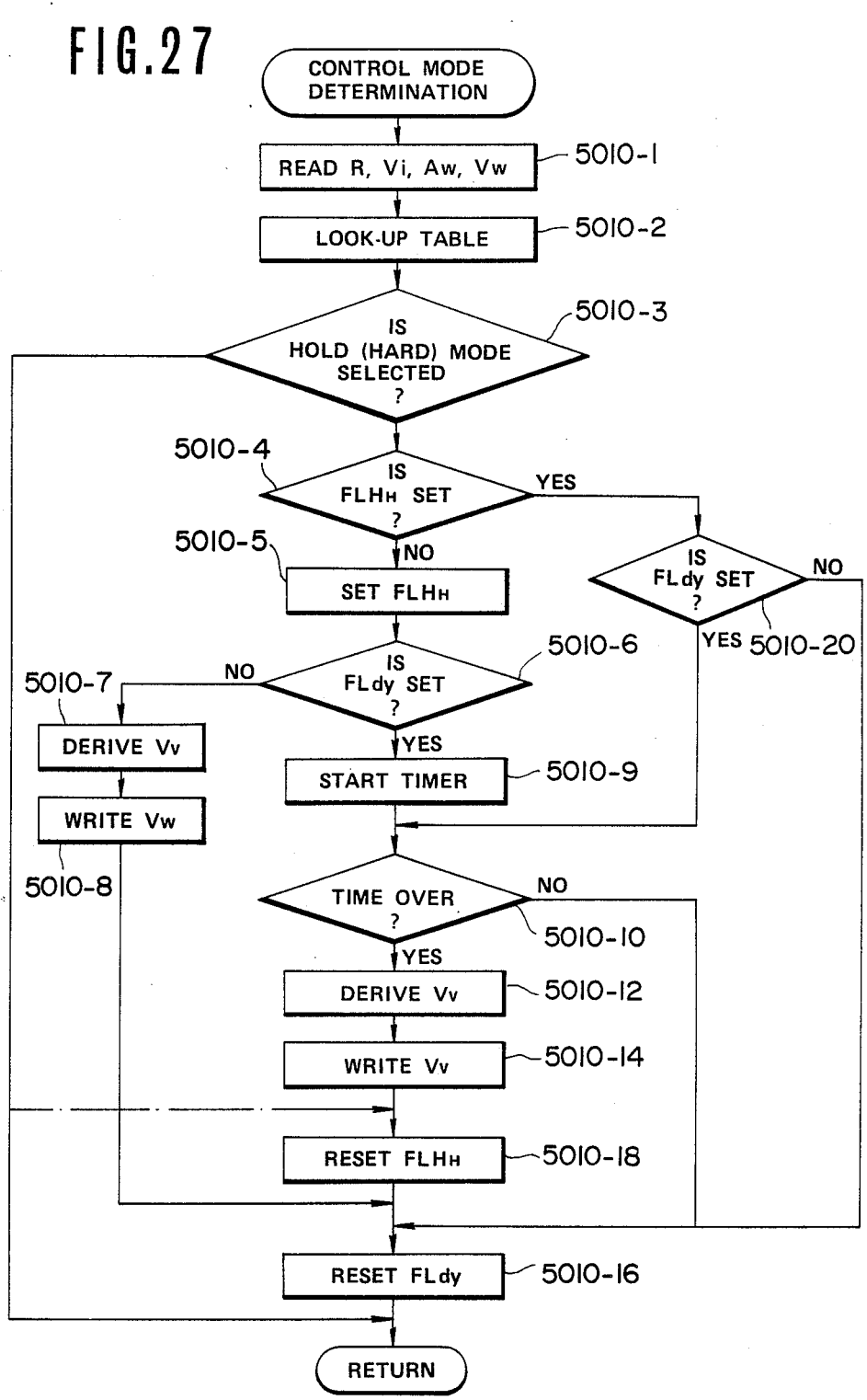
FIG. 27 is a flowchart of a subsroutine in the output calculation program of FIG. 23, which is executed for deriving the control mode of the control system and deriving a timing for projecting a projected speed.

FIG. 27 shows the greater detail of the process in the block 5010 to select the operational mode. As set forth above, the mode selection is made in accordance with the schedule shown in FIG. 26. In order to perform selection, the controller unit may include a table of FIG. 26 in RAM in a form of look-up table which is looked-up in terms of the wheel speed $V_w$, wheel acceleration $a_w$, slip rate R and the target wheel speed $V_i$. Therefore, at an initial block 5010-1 of the operational mode selection block 5010, the necessary parameters $V_w$, $a_w$, R and $V_i$ are read out. On the basis of read out parameter, the table of FIG. 26 is looked up to derive operational mode adapted to the brake condition situated by the read parameters. This table look-up is taken place at a block 5010-2. After this block 5010-2, the selected operational mode is checked at a block 5010-3 if HOLD mode to hold the braking pressure at increased level, which mode is referred to as "HOLD (HIGH) mode" in FIG. 27. When the selected mode is other than HOLD (HIGH) mode, the process of the block 5010 ends to move processing to output EV and AV signals in accordance with the selected mode.

On the other hand, when the selected operational mode is HOLD (HIGH) mode, then, increased pressure holding mode indicative flag $FLH_H$ which will be hereafter referred to as "$H_H$ flag" is checked, at a step 5010-4. When the $H_H$ flag $FLG_H$ is not set as checked at the block 5010-4, the $H_H$ flag is set in a flag register 259 at a block 5010-5. Thereafter, the delay demand flag $FL_{dy}$ which is to be set at the step 2041 of the main routine of FIG. 15, is checked at a block 5010-6. When the delay demand flag $FL_{dy}$ is not set as checked at the block 5010-6, the projected speed $V_v$ is derived at a block 5010-7 on the basis of the read wheel speed $V_w$. This projected speed is latched in a temporary register 255 in the controller unit as base value for deriving subsequent projected or estimated vehicle speed, at a block 5010-8. After this, process moves to outputting of the EV and AV signals.

On the other hand, when the delay demand flag $FL_{dy}$ is set as checked at the block 5010-6, a delay timer 253 in the controller unit is started to measure an elapsed time at a block 5010-9. Then, the delay timer value is checked if it indicates expiring of a predetermined delay time, at a block 5010-10. When the predetermined delay time is not yet expired as checked at the block 5010-10, then process moves to output EV and AV signals without projecting the estimated vehicle speed $V_v$.

After the cycle in which the $H_H$ flag $FLH_H$ is set at the block 5010-5, the process jumps from the block 5010-4 to the block 5010-10. This is repeated until the predetermined delay time expires. When expiration of the predetermined delay time is detected as checked at the block 5010-10, then, the estimated vehicle speed $V_v$ is projected at a block 5010-12 on the basis of instantaneous wheel speed $V_w$ at which the predetermined delay time expires. Similarly to the block 5010-8, the projected value $V_v$ is latched and written in the temporary register 255, at a block 5010-14. After this block 5010-14, the delay demand flag $FL_{dy}$ is reset at a block 5010-16.

On the other hand, the $H_H$ flag $FLH_H$ may be reset at appropriate portion of the output calculation program or other associated programs. In preferred procedure, the $H_H$ flag is reset every time that the operational mode other hand HOLD (HIGH) mode is selected, at a block 5010-18 following the block 5010-3, as illustrated in phantom line.

When the $H_H$ flag is set as checked at the step 010-4, then, the delay demand flag $FL_{dy}$ is checked at a step 5010-20. If the delay demand flag is set, process goes to the step 5010-10. Otherwise process goes to the step 5010-16.

It would be appreciated that the predetermined delay time may be determined experimentary and set long enough to avoid any possibility of projecting the estimate vehicle speed higher than the actual vehicle speed. For instance, in the preferred embodiment, the delay time is set about.

Figure 28:
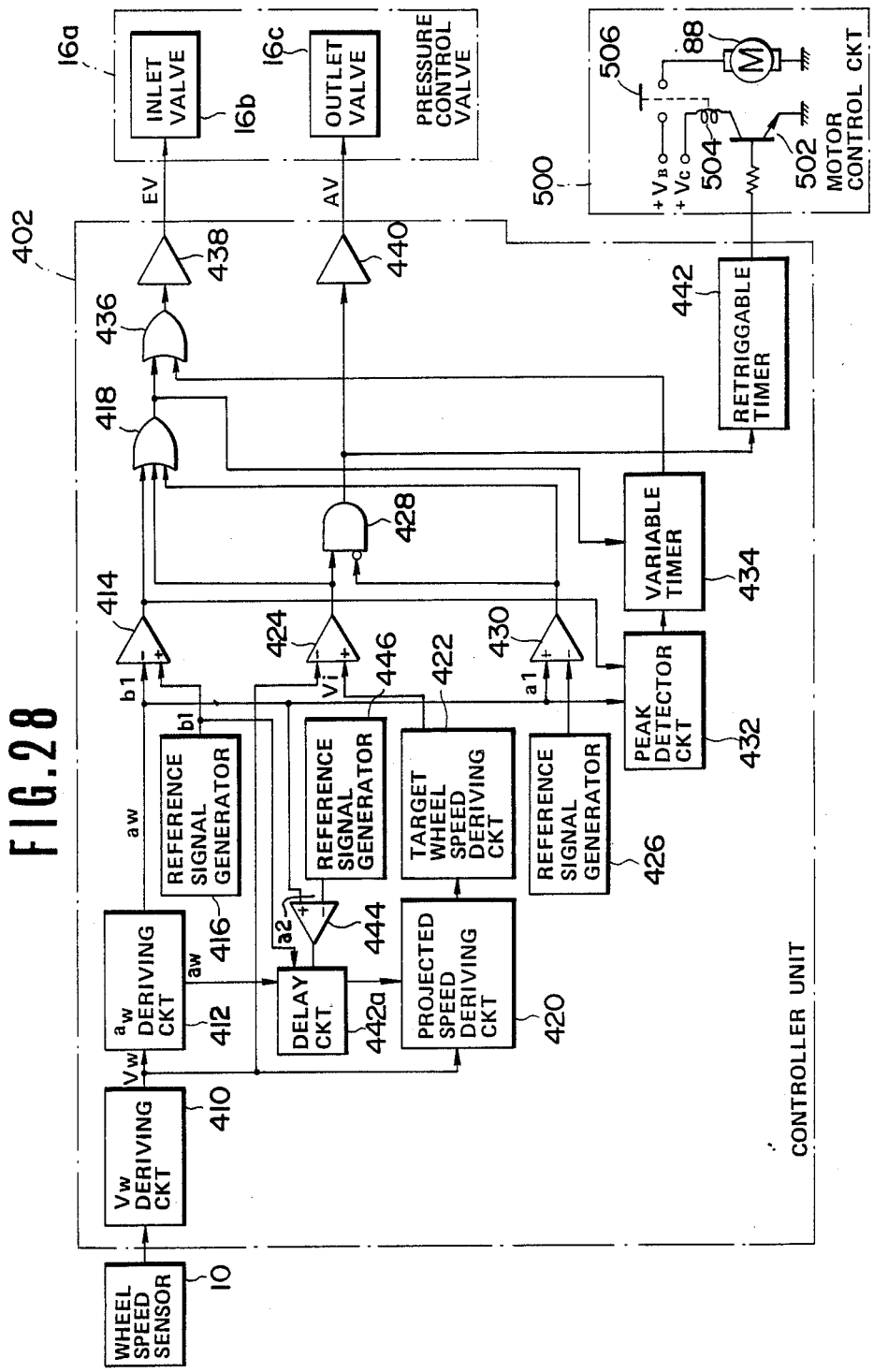
FIG. 28 is a block diagram of the second embodiment of an anti-skid brake control system according to the present invention.

FIG. 28 shows a circuit construction of the controller unit of another embodiment of the anti-skid control system according to the present invention. In this another embodiment, the controller unit 202, 204 and 206 of the overall system as illustrated in FIG. 1 have respectively identical circuit constructions to the others Therefore, in order to simplify the disclosure, the detailed description would be given hereafter is directed to only the controller unit 202. With respect to the controller unit 204 and 206, it should be appreciated that the identical circuit construction to that of the controller 202 is provided respectively.

In FIG. 28, a wheel speed deriving circuit 410 is connected to the wheel speed sensor 10 to receive wheel speed indicative signals. The wheel speed deriving circuit 410 is adapted to output a wheel speed indicative signal having a value proportional to the pulse frequency of the wheel speed sensor signal from the wheel speed sensor. The wheel speed indicative signal is supplied to an acceleration deriving circuit 412. The wheel acceleration deriving circuit 412 differentiates the wheel speed indicative signal value to derive wheel acceleration value $a_w$ and outputs a wheel acceleration indicative signal. The wheel acceleration indicative signal is input to the negative input terminal of a differential amplifier 414. The positive input terminal of the differential amplifier 414 is connected to a reference signal generator 416 to receive a reference signal. The reference signal value is representative of a preset deceleration value, e.g. $-1$ G. Therefore, as long as the wheel acceleration indicative signal value is greater than the preset deceleration value, the output level of the differential amplifier remains LOW. On the other hand, when the wheel acceleration indicative signal value becomes less than the preset deceleration value, the output level of the differential amplifier 414 goes HIGH. The output of the differential amplifier 414 is supplied to one of the three input terminals of an OR gate 418.

The wheel speed deriving circuit 410 is also connected to a projected speed deriving circuit 420. The projected speed deriving circuit is also connected to the wheel acceleration deriving circuit 412 to receive the wheel acceleration indicative signal. The projected speed deriving circuit 420 is adapted to latch the wheel speed indicative signal value when wheel acceleration indicative signal value becomes equal to or greater than the preset deceleration value. The projected speed deriving circuit 420 includes memories for storing latched wheel speed indicative signal values of the current skid cycle and the immediately preceding skid cycle. In addition, the projected speed deriving circuit measures the interval between occurrences of latching of the wheel speed indicative signal values and from the measured period of time, the projected speed deriving circuit derives an average angular deceleration value. This deceleration value may be used to derive a projected speed value for the next cycle of anti-skid control. For instance, each instantaneous projected speed may be derived by the following equation:

$$V_c = V_{wnew} + dV_w \times t$$

where $V_c$ is the projected speed;

$V_{wnew}$ is the wheel speed at which the wheel acceleration indicative signal value equal to or less than the preset deceleration value is obtained;

$dV_w$ is the derived deceleration value; and t is elapsed time since deviation of the value $V_{wnew}$.

The projected speed $V_c$ represents an estimated vehicle speed based on the measured wheel speed. The vehicle speed can be obtained directly from the wheel speed whenever zero slip can be assumed. Therefore, in the shown embodiment, it is assumed that, when the preset deceleration value, e.g. $-1$ G, is obtained, wheel slip relative to the vehicle ground speed will be zero or negligible and so can be ignored. The timing at which the wheel acceleration value becomes equal to or less than the preset deceleration value is thus regarded as cripping point for increasing wheel slippage relative to the vehicle from zero by further decelerating operation.

In addition, it should be appreciated that, in the first cycle of anti-skid control, a fixed value, e.g. $-0.4$ G will be used as the deceleration value.

Procedures for deriving the projected speed can also be seen in the U.S. Pat. No. 4,392,202, issued July 5, 1983; U.S. Pat. No. 4,384,330, issued May 17, 1983; and U.S. Pat. No. 4,430,714 issued Feb. 7, 1984, respectively to the inventor of this invention and commonly assigned to the assignee of this invention. Disclosure of the above-identified U.S. Patents are herewith incorporated by reference for the sake of disclosure.

Returning to FIG. 28, the projected speed deriving circuit 420 is connected to a target wheel speed deriving circuit 422. The target wheel speed deriving circuit 422 is adapted to derive a target wheel speed which is optimally related to the vehicle speed. The target wheel speed means a wheel speed to which the wheel speed is to be adjusted in order to obtain optimal braking characteristics. In general, as is well known, braking characteristics are optimized when wheel slippage relative to the vehicle speed is in the range of 15% to 20%. Therefore, according to the preferred embodiment of the invention, the target wheel speed is chosen to be 85% of the projected vehicle speed. The target wheel speed deriving circuit 422 thus outputs a target wheel speed indicative signal having a value corresponding to 85% of the projected speed.

The target wheel speed deriving circuit 422 is connected to the positive input terminal of a differential amplifier 424. The negative input terminal of the differential amplifier is connected to the wheel speed deriving circuit 410. The differential amplifier 424 compares the wheel speed indicative signal value with the target wheel speed indicative signal value and outputs a HIGH-level comparator signal as long as the wheel speed indicative signal value is less than the target wheel indicative signal value. On the other hand, the output level of the differential amplifier goes LOW when the wheel speed indicative signal value becomes greater than the target wheel speed indicative signal value. The output terminal of the differential amplifier 424 is connected to an AND gate 428 to supply the comparator output thereto.

The wheel acceleration deriving circuit 412 is also connected to the positive terminal of a differential amplifier 430. The negative input terminal of the differential amplifier 430 is connected to a reference signal generator 426. The reference signal generator 426 outputs a reference signal having a value representative of a preset acceleration value, e.g. 0.6 G. The differential amplifier 430 outputs a HIGH-level signal when the wheel acceleration indicative signal value is greater than the reference signal value, and, conversely, a LOW-level signal when the wheel acceleration indicative signal value is less than the reference signal value.

A peak detector circuit 432 also receives the wheel acceleration and deceleration indicative signal value from the wheel acceleration deriving circuit 412. The peak detector circuit 432 latches the peak value of the wheel acceleration indicative signal. The peak detector circuit 432 outputs a peak value indicative signal, value of which is representative of the latched peak value of wheel acceleration. The peak value indicative signal is sent to a variable timer 434. The variable timer 434 is also connected to the output terminal of the OR gate 418. The variable timer 434 is responsive to change in the output of the OR gate 418 from HIGH level to LOW level to be triggered for a period of time corresponding to the value of the peak value indicative signal.

The OR gate 418 is connected to the output terminals of the three differential amplifiers 414, 424 and 430. The differential amplifier 414 outputs a HIGH-level comparator signal when the wheel acceleration indicative signal value is less than the preset deceleration value. The preset deceleration value represents a pressure release threshold. Therefore, a HIGH-level output from comparator 414 indicates deceleration of the wheel beyond the pressure release threshold. The differential amplifier 430 outputs a HIGH-level comparator signal when the wheel acceleration indicative signal value is greater than the preset acceleration value. The preset acceleration value is representative of a pressure apply threshold. Therefore, a HIGH-level signal from comparator 430 indicates acceleration of the wheel beyond the pressure apply threshold. On the other hand, the differential amplifier 424 outputs a HIGH-level comparator signal when the wheel speed value is less than the target wheel speed value. Therefore, the output of the OR gate 418 is HIGH when wheel acceleration is less than the preset deceleration value or greater than the preset acceleration value, or when the wheel speed is less than the target wheel speed.

The output of the OR gate 418 is supplied to one input terminal of an OR gate 436. In addition, the output of OR gate 418 is supplied to the variable timer. As set forth above, the variable timer responds to change in the gate signal level from HIGH to LOW by outputting a HIGH-level timer signal for a given period of time derived according to the peak value of the wheel acceleration to the OR gate 436. The OR gate 436 transmits the HIGH-level output to an amplifier 438 which in turn supplies an amplifier output to the inlet valve as inlet signal EV.

The differential amplifier 424 is also connected for output to an AND gate 428. In addition, the differential amplifier 430 is connected to an inverting input terminal of the AND gate 428. The differential amplifier 424 outputs a HIGH-level comparator signal when wheel speed is less than the target wheel speed, the differential amplifier 430 outputs a LOW-level comparator signal when the wheel acceleration value is smaller the preset acceleration value, and the AND gate 428 outputs a HIGH-level gate signal only when both of these conditions are satisfied. Otherwise, the output level of the AND gate 428 remains LOW. The AND gate is connected for output to an amplifier 440 which in turn sends an amplifier signal to outlet valve as outlet signal AV.

The AND gate 428 is also connected to a retriggable timer 442. The retriggable timer 442 is responsive to a HIGH-level output from the AND gate 428 to be triggered for a period of time longer than maximum duration of one cycle of skid control. The retriggable timer 442 is connected for output to the base electrode of a switching transistor 502 in a motor control circuit 500 which controls operation of the motor 88 of the fluid pump 90. The transistor 502 is rendered conductive by the HIGH-level trigger signal from the retriggable timer 442 to energize a relay coil 504 connected to collecter electrode thereof. A relay switch 506 is turned ON by energization of the relay coil 504 to close a power supply circuit for the motor 88. Therefore, the motor 88 is driven for the period of time for which the retriggable timer 442 is triggered.

A delay circuit 442a is interposed between the wheel acceleration deriving circuit 412 and the projected speed deriving circuit 420. The delay circuit 442a is connected to a differential amplifier 444 connected to the output terminal of the wheel acceleration deriving circuit 412 at the positive input terminal. The negative input terminal of the differential amplifier 444 is connected to a reference signal generator 446 which produces a reference signal indicative of a reference value $a_2$. The reference value $a_2$ is greater than the reference signal value $a_1$ and representative of overrunning criteria experimentarily obtained.

Figure 29:
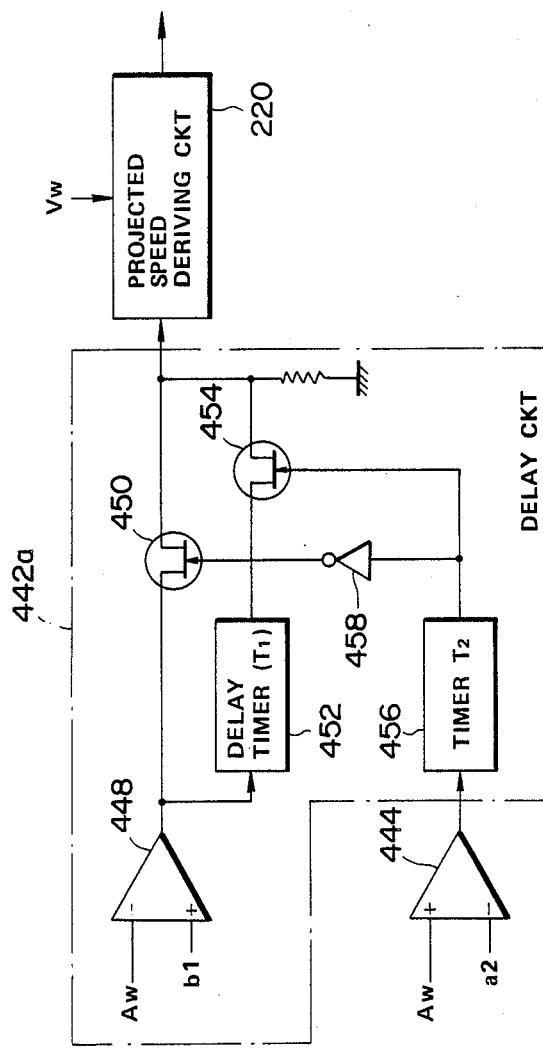
FIG. 29 is a block diagram showing the detail of a delay circuit in the second embodiment of anti-skid brake control system of FIG. 28.

FIG. 29 shows detailed circuit construction of the delay circuit 442a in FIG. 28. The delay circuit includes a differential amplifier 448 for comparing the wheel acceleration indicative signal value $a_w$ and the reference signal value $b_1$ fed from the reference signal generator 416. The output of the differential amplifier 448 is connected to an analog switch 450 comprising a field-effect transistor. The output of the differential amplifier 448 is also connected to a delay timer 452 which is, in turn, connected to another analog switch 454 comprising the field effect transistor. The delay timer 452 has a timer constant $T_1$. The output level of the delay timer is normally maintained HIGH and turns into LOW in response to the leading edge of the HIGH level output from the differential amplifier 448. LOW level output of the delay timer 452 is maintained for the period of time $T_1$. The output level of the delay timer 452 returns HIGH after the given period of time $T_1$.

Another timer 456 is connected to the differential amplifier 444 to receive therefrom the output of the differential amplifier. The timer 456 has a time constant $T_2$ and is responsive to the trailing edge of the HIGH level differential amplifier output to produce a HIGH level timer signal for the given period of time $T_2$. The timer 456 is connected to the analog switch 450 via an inverter 458. Therefore, as long as the HIGH level output of the timer 456 is maintained, the input to the analog switch 450 remains LOW. As a result, the analog switch 450 is held OFF while the timer 456 outputs HIGH level timer signal. The timer 456 is also connected to the analog switch 454. The analog switch 454 receives a HIGH-level timer signal from the timer 456 while the output of the timer 456 remains HIGH.

As will be appreciated herefrom, the timer 456 disables the analog switch 450 for the given delay time $T_2$. If wheel acceleration decreased across the reference value $b_1$ is detected during the this period, the delay timer 452 feeds HIGH level signal through the analog switch 454 after the given delay time $T_1$ expires.

On the other hand, in the normal state, the output level of the differential amplifier 444 remains LOW to keep the output level of the timer 456 LOW. As a result, the analog switch 450 remains ON to pass the output of the differential amplifier 448 to the projected speed deriving circuit.

Therefore, when the wheel acceleration increases across the reference value $a_2$, the projected speed is derived after the delay time $T_1$ provided by the delay timer 452.

Figure 30:
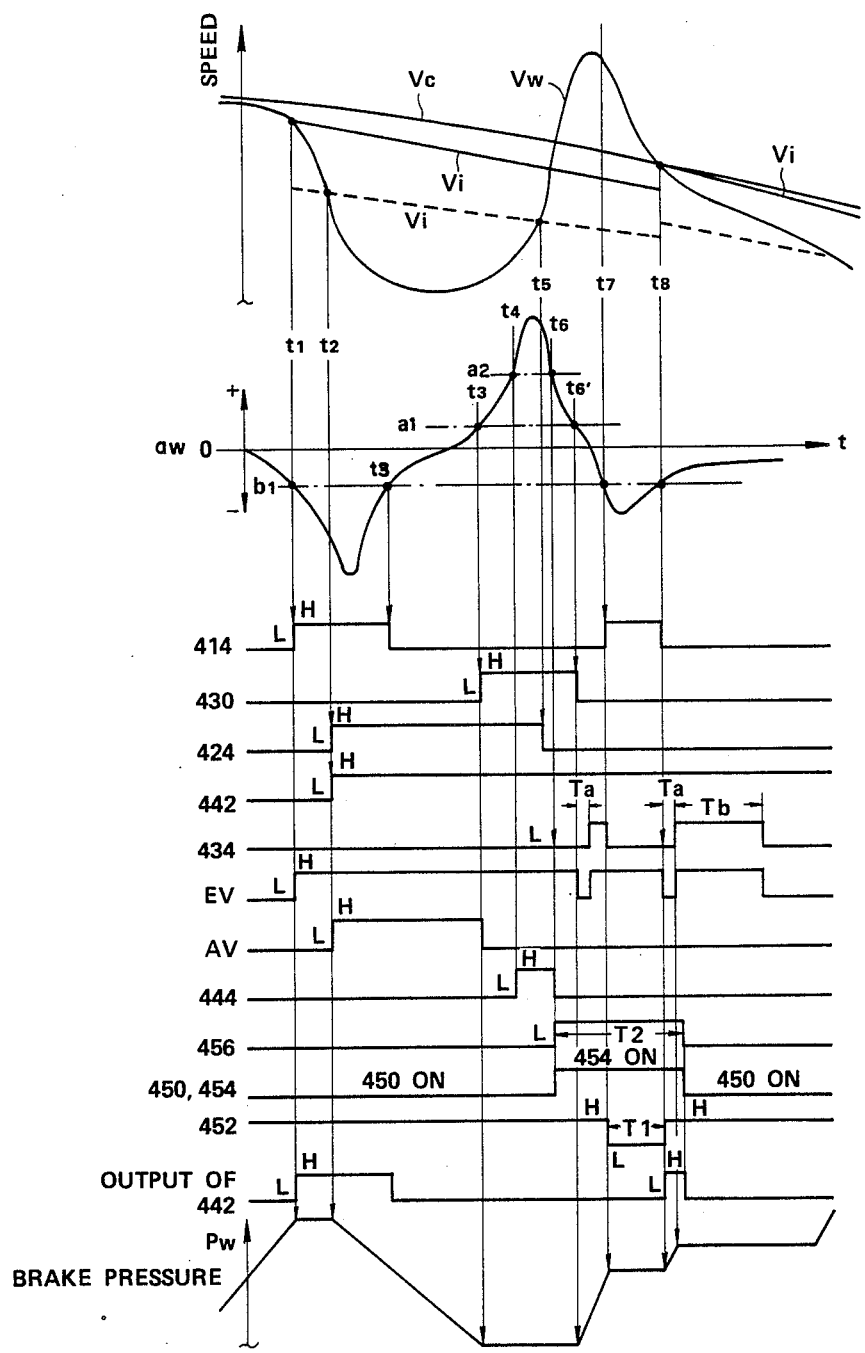
FIG. 30 is a timing chart showing operation of the second embodiment of anti-skid control system of FIG. 28.

FIG. 30 shows a timing chart showing operation of the controller of FIG. 28, which occurs when the wheel acceleration increases across the given threshold represented by the reference signal $a_2$.

Similarly to the normal procedure, the projected speed is derived at the time $t_1$ at which the wheel acceleration $a_w$ decreases across the reference value $b_1$. Deriving of the projected speed $V_y$ is performed in response to the HIGH level output from the differential amplifier 448 by the projected speed deriving circuit 420. At this time, since wheel acceleration higher than the reference $a_2$ has not been detected and thus, the differential amplifier 444 outputs LOW level signal, the analog switch 450 is held ON to pass the output of the differential amplifier 444 to the projected speed deriving circuit.

At the time, $t_1$, the operational mode of the pressure control valve is switched from the APPLICATION mode to the HOLD mode to hold the braking pressure at the increased level. After this, wheel speed $V_w$ drops below the target wheel speed $V_i$ which is derived on the basis of the projected speed $V_y$, at a time $t_2$. Thus, the operational mode is switched from the HOLD mode to the RELEASE mode to decrease the braking pressure to recover the wheel speed. At a time $t_3$, wheel acceleration $a_w$ as increased reaches the reference value $a_1$ to switch the operational mode from the RELEASE mode to the HOLD mode to hold the braking pressure at the reduced level. At a time $t_4$, the wheel acceleration $a_w$, as further increased, reaches the reference value $a_2$. In response to this, the differential amplifier 444 turns its output from LOW to HIGH. As a result, the analog switch 450 is turned OFF. Since the output of the differential amplifier 444 remains HIGH for the given period of time $T_2$, the analog switch 450 remains in the OFF position during this period. Subsequently, the wheel acceleration drops across the reference value $a_1$ at the time $t_6$ and subsequently across the reference value $b_1$ at the time $t_7$. The differential amplifier 448 outputs HIGH level signal. However, at this time, the analog switch 450 is maintained in the OFF position, and the electrical communication between the differential amplifier 448 and the projected speed deriving circuit 220 is blocked. The delay timer 452 then becomes active to turn the signal level from HIGH to LOW and maintains the signal level LOW for the given period of time $T_1$. After expiration of the given period of time $T_1$, i.e. at the time $t_8$, the HIGH level output of the differential amplifier 448 is fed to the projected speed deriving circuit 420 to trigger the latter. As a result, at the time $t_8$, the projected speed to be used for the skid control in the current skid cycle is derived at the time $t_8$.

By this procedure, one many successfully avoid setting the projected speed above the actual vehicle speed to cause the no-braking state. Further, according to the present invention, even when wheel spinning occurs, the system is successfully prevented from producing control signal to place the pressure control valve in the RELEASE or HOLD modes.

Therefore, the invention fulfills all of the objects and advantages sought therefor.

What is claimed is:

1. An anti-skid brake control system for an automotive brake system comprising:

a hydraulic brake system including a wheel cylinder for applying braking pressure to a vehicle wheel, and a pressure control valve associated with said wheel cylinder for adjusting fluid pressure in said wheel cylinder, said pressure control valve being operative to increase fluid pressure in the wheel cylinder in a first position thereof, to hold the braking pressure at one of an increased or decreased level at a second position thereof, and to decrease the braking pressure at a third position thereof;

a wheel speed sensor producing a wheel speed indicative signal having a value indicative of the wheel speed;

a controller deriving a wheel acceleration and other brake control parameters on the basis of the wheel speed indicative signal value, said controller including first means for projecting a projected speed corresponding to a vehicle speed on the basis of said wheel speed indicative signal value at a timing at which wheel acceleration is decreased to a first threshold value, said controller selecting an operational mode of said pressure control valve on the basis of said control parameters including wheel acceleration and the projected speed derived by said first means to produce a control signal to operate said pressure control valve to one of said valve positions, and said controller further including second means for determining overrunning of the wheel speed beyond the vehicle speed by comparing said wheel acceleration with a predetermined overrunning threshold value, to cause a given delay in operation of said first means for deriving said projected speed after said timing at which the wheel acceleration decreases across said first threshold in a subsequent skid control cycle.

2. The anti-skid brake control system as set forth in claim 1, wherein said controller compares said wheel acceleration with a second threshold of determining said overrunning state of the wheel to cause delay in deriving the projected speed.

3. The anti-skid brake control system as set forth in claim 1, wherein said controller produces a control signal to operate said pressure control valve to said second position to hold said braking pressure at said increased level when wheel acceleration decreases across said first threshold and, at the same time projecting said projected speed; to operate said pressure control valve to said third position when wheel speed decreases across a target wheel speed which is derived relative to an estimate vehicle speed estimated on the basis of said projected speed; to operate said pressure control valve to said second position for holding the braking pressure at said decreased level when wheel acceleration increases across a second threshold; and to operate said pressure control valve to said first position when wheel acceleration decreases across said second threshold.

4. The anti-skid brake control system as set forth in claim 1, wherein said controller produces a control signal to operate said pressure control valve to said second position to hold said braking pressure at said increased level when wheel acceleration decreases to said first threshold defining a deceleration threshold; to said third position when wheel slippage increases across a given slippage threshold derived on the basis of wheel speed variation and said projected speed; to said second position for holding the braking pressure at said decreased level when wheel acceleration increases across a second threshold defining an acceleration threshold; and to said first position when wheel acceleration decreases across said second threshold.

5. The anti-skid brake control system as set forth in claim 3, wherein said second threshold is greater than said first threshold.

6. The anti-skid brake control system as set forth in claim 4, wherein said second threshold is greater than said first threshold.

7. An anti-skid brake control system for an automotive brake system comprising:
a hydraulic brake system including a wheel cylinder for applying braking pressure to a vehicle wheel, and a pressure control valve associated with said wheel cylinder for adjusting fluid pressure in said wheel cylinder, said pressure control valve being operative to increase fluid pressure to increase braking pressure in a first position thereof, to hold the braking pressure at one of an increased or decreased level in a second position thereof, and to decrease the braking pressure in a third position thereof;
a wheel speed sensor producing a wheel speed indicative signal having a value corresponding to wheel speed;
first means for processing said wheel speed indicative signal for deriving brake control parameters including wheel acceleration, said first means latching said wheel speed indicative signal value as a projected speed value when derived wheel acceleration decreases across a first threshold;
second means for selecting an operational mode of said pressure control valve on the basis of brake control parameters to produce a control signal to operate said pressure control valve to one of said valve positions, said second means activating said first means for latching the wheel speed indicative signal value with said control signal to operate said pressure control valve to said second position, and
third means for comparing said wheel acceleration with a predetermined reference value which is representative of a wheel speed overrunning criteria in relation to an assumed vehicle speed, to cause delay of operation of said first means to latch the wheel speed indicative signal value for a given period of time, after wheel acceleration has decreased across said first threshold, when wheel acceleration increases across said reference value before decreasing across said first threshold in a subsequent skid control cycle.

8. The anti-skid brake control system as set forth in claim 7, wherein said second means produces said control signal to operate said pressure control valve to said second position to hold said brake pressure at said increases level when wheel acceleration decreases across said first threshold, to said third position when wheel slippage reaches a second slippage threshold, to said second position for holding the braking pressure at said decreased level when wheel acceleration increases across a third acceleration threshold, and to said first position when wheel acceleration decreases across said third acceleration threshold.

9. The anti-skid brake control system as set forth in claim 8, wherein said third acceleration threshold is an estimated value having a corresponding vehicle speed and variable from said projected speed according to variation of the wheel speed.

10. The anti-skid brake control system as set forth in claim 8, wherein said second threshold is a target wheel speed derived on the basis of said projected speed and variable according to variation of said wheel speed.

11. A method for anti-skid brake control for an automotive brake system comprising the steps of:
detecting wheel speed;
deriving wheel acceleration on the basis of detected wheel speed;
latching the detected wheel speed indicative value as a projected speed when derived wheel acceleration decreases across a first threshold value;
controlling a pressure control valve disposed within a hydraulic brake circuit including a wheel cylinder to increase braking pressure in said brake circuit in a first operational mode, to hold braking pressure constant at one of an increased or decreased level in a second operational mode, and to decrease said braking pressure in a third operational mode, said second operational mode to hold braking pressure at said increased level being selected when the wheel acceleration decreases across said first threshold value, said third mode being selected when wheel slippage derived on the basis of said wheel speed and said projected speed decreases across a second threshold value, said second mode to hold braking pressure at said decreased level being selected when wheel acceleration increases across a third threshold value, and said first mode being selected when wheel acceleration decreases across said third threshold; and
detecting wheel acceleration increasing greater than a predetermined reference value representative of a wheel speed overrunning threshold relative to an assumed vehicle speed, to cause delay for a given period of time for latching said projected speed after subsequently detecting wheel acceleration decreasing across said first threshold in a subsequent skid control cycle.

12. The method as set forth in claim 11, in which said second threshold is a target wheel speed derived below said projected speed at a given rate and variable according to variation rate of wheel speed.

13. The method as set forth in claim 11, in which said latching of said projected speed takes place simultaneously with selection of said second mode unless wheel acceleration greater than said reference value is not detected in advance of detection of wheel acceleration decreasing across said first threshold.

14. The method as set forth in claim 13, in which said latching of projected speed is carried out to latch wheel speed at the time at which said given delay time expires, when delay for latching of projected wheel speed is caused.

15. An anti-skid brake control system for an automotive brake system comprising:
- a hydraulic brake system including a wheel cylinder applying braking pressure to a vehicle wheel, and a pressure control valve associated with said wheel cylinder for adjusting fluid pressure in said wheel cylinder, said pressure control valve being operative to increase fluid pressure in said wheel cylinder in a first position thereof, to hold braking pressure at one of an increased or decreased level at a second position thereof, and to decrease braking pressure at a third position thereof, said pressure control valve operating to vary position according to a predetermined schedule in each skid control cycle;
- a wheel speed sensor producing a wheel speed indicative signal having a value indicative of wheel speed;
- wheel acceleration deriving means for deriving wheel acceleration data on the basis of said wheel speed indicative signal;
- projecting speed deriving means for detecting an initiation time for each skid control cycle, at which wheel acceleration decreases across a predetermined first threshold, for latching an instantaneous wheel speed indicative signal value, and for deriving projected speed data varying at a given rate on the basis on said latched wheel speed indicative signal value;
- control signal generator means for receiving said wheel acceleration data to detect wheel acceleration decreasing across said first threshold for triggering a skid control cycle and for deriving a control signal for operating said pressure control valve according to said predetermined schedule on the bases of said wheel acceleration data and said projected speed data; and
- overrunning state detecting means for detecting wheel acceleration data increasing across a second threshold value for producing a delay command for providing a given delay of trigger timing of said skid control cycle from said initiation time.

* * * * *